(12) United States Patent
Ogiwara et al.

(10) Patent No.: US 7,489,615 B2
(45) Date of Patent: Feb. 10, 2009

(54) OBJECTIVE OPTICAL ELEMENT, OPTICAL PICKUP APPARATUS AND OPTICAL DISC DRIVING APPARATUS

(75) Inventors: Kenji Ogiwara, Hachioji (JP); Tohru Kimura, Hachioji (JP)

(73) Assignee: Konica Minolta Opto, Inc. (JP)

( * ) Notice: Subject to any disclaimer, the term of this patent is extended or adjusted under 35 U.S.C. 154(b) by 702 days.

(21) Appl. No.: 11/209,113

(22) Filed: Aug. 22, 2005

(65) Prior Publication Data

US 2006/0062103 A1 Mar. 23, 2006

(30) Foreign Application Priority Data

Aug. 25, 2004 (JP) ............................. 2004-245490

(51) Int. Cl.
*G11B 7/00* (2006.01)
(52) U.S. Cl. ..................... 369/112.01; 369/112.233
(58) Field of Classification Search ............ 369/112.01, 369/112.02, 112.23, 44.37, 44.32
See application file for complete search history.

(56) References Cited

U.S. PATENT DOCUMENTS 6,418,108 B1 * 7/2002 Ueda et al. ............. 369/112.23

OTHER PUBLICATIONS

Kyu Takada, et al., "Blu-ray Disc / DVD Compatible Objective Lens Assembly", "Technical Digest", International Symposium on Optical Memory 2003 (ISOM 2003), Nov. 3-7, 2003 p. 230, 231.

* cited by examiner

*Primary Examiner*—Nabil Z Hindi
(74) *Attorney, Agent, or Firm*—Cantor Colburn LLP

(57) ABSTRACT

An objective optical element for use in an optical pickup apparatus for recording and/or reproducing information on first—third optical information recording media using first—third light fluxes respectively, includes:

a first phase structure for compensating a deterioration in a performance forming the converged spot on the information recording surface of the first optical information recording medium caused by an temperature change, a second phase structure for reducing a spherical aberration based on a thickness difference between the protective substrates of the first and second optical information media or the a wavelength difference between the first and second wavelengths, and a third phase structure for reducing a spherical aberration based on a thickness difference between the protective substrate of the first and third optical information media.

31 Claims, 13 Drawing Sheets

OPTICAL AXIS

OPTICAL AXIS

OPTICAL AXIS

OPTICAL AXIS

OPTICAL AXIS

OPTICAL AXIS

OPTICAL AXIS

OPTICAL AXIS

OBJECTIVE OPTICAL ELEMENT, OPTICAL PICKUP APPARATUS AND OPTICAL DISC DRIVING APPARATUS

This application is based on Japanese Patent Application No. 2004-245490 filed on Aug. 25, 2004, in Japanese Patent Office, the entire content of which is hereby incorporated by reference.

FIELD OF THE INVENTION

The present invention relates to an objective optical element, an optical pickup apparatus and an optical disc driving apparatus.

BACKGROUND OF THE INVENTION

There have been known optical pickup apparatuses having compatibility for a high density optical disc wherein recording density has been enhanced by using a violet laser light source, DVD (employing a red laser light source) and CD (employing an infrared laser light source), and an objective optical element that is used for the optical pickup apparatus above (for example, see non-Patent Document 1).

In the non-Patent Document 1, there is disclosed a technology wherein a phase structure is provided on one optical surface of an objective optical element of a two-group two-element type composed of a plastic correcting element and a glass light-converging optical element. Thereby, a function of the phase structure corrects spherical aberration caused by a protective layer thickness difference between a high density optical disc and DVD.

(Non-Patent Document 1) "TECHNICAL DIGEST", INTERNATIONAL SYMPOSIUM ON OPTICAL MEMORY 2003 (ISOM 2003), Nov. 3-7, 2003 P230, 231.

SUMMARY OF THE INVENTION

However, when a part of an optical element forming an objective optical element is made of glass as in the Non-Patent Document 1, the total weight of the objective optical element grows larger because a specific gravity of glass is greater than that of plastic, and there is caused a problem that burdens for the driving mechanism (an actuator for focusing and tracking) are increased. To solve this problem, therefore, a high-performance and large-sized actuator needs to be arranged, resulting in another problem that space-saving of an optical pickup apparatus is needed and production cost is increased.

There is also caused a problem that objective optical elements cannot be manufactured on a mass production basis and production cost is increased accordingly, because injection molding is impossible for glass and manufacture is difficult.

Further, even in the case where a part of an optical element forming an objective optical element is made of plastic which has a small specific gravity and allows injection molding, a temperature of this plastic optical element is changed by heat release from the actuator and by fluctuations of ambient temperatures in the course of operations of the optical pickup apparatus, whereby, a refractive index is greatly varied by the temperature changes, resulting in a fear that stable recording and reproducing characteristics are not obtained.

In view of the problems stated above, an embodiment of the invention is to provide an objective optical element having excellent temperature characteristics, an optical pickup apparatus equipped with the objective optical element, and an optical disc driving apparatus provided with the optical pickup apparatus, in which the objective lens properly corrects spherical aberration caused by a protective layer thickness difference for a high density optical disc, DVD and CD, or spherical aberration caused by a working wavelength difference for a high density optical disc, DVD and CD, by using a function of the phase structure, and the objective lens provides high light utilization efficiency for a violet wavelength area with wavelength near 400 nm, a red wavelength area with wavelength near 650 nm, and for an infrared wavelength area with wavelength near 780 nm.

In the present specification, optical discs employing a violet laser light source such as Blu-ray disc (hereinafter referred to simply as "BD") employing an objective lens with NA 0.85 and having a protective layer thickness of 0.0875 mm and HD DVD employing an objective lens with NA 0.65-0.67 and having a protective layer thickness of 0.6 mm are named generically as "high density optical disc" which is abbreviated as "HD". It is assumed that a magneto-optical disc, an optical disc having, on its information recording surface, a protective layer whose thickness is about several nm—several tens nm, and an optical disc wherein a thickness of its protective layer or protective film is zero, in addition to the aforesaid Blu-ray disc BD and HD DVD, are included in the high density disc.

In the present specification, DVD (digital versatile disc) is a generic name for DVD type optical discs such as DVD-ROM, DVD-Video, DVD-Audio, DVD-RAM, DVD-R, DVD-RW, DVD+R and DVD+RW, and CD (compact disc) is a generic name for CD type optical discs such as CD-ROM, CD-Audio, CD-Video, CD-R and CD-RW.

In the present specification, a "light-converging optical element" means a lens arranged at the position facing an optical disc in an optical pickup apparatus and has a function to converge a light flux emitted from a light source on an information recording surface of the optical disc.

Further, in the present specification, an "objective optical element" means an optical system that is provided with the light-converging optical element mentioned above and an aberration-correcting lens group that is operated by an actuator for tracking and focusing together with the light-converging optical element. The aberration-correcting lens group mentioned here may either be composed of one lens group or be composed of two or more lens groups.

Further, "compensating for deterioration of the power for forming a converged spot on an information recording surface of the first optical information recording medium caused by temperature changes" or "compensating a deterioration in a performance forming the converged spot on the information recording surface of the first optical information recording medium caused by an temperature change" means that wavefront aberration in the case of converging the first light flux through the objective optical element and a protective substrate of the first optical information recording medium is not more than 0.05 λ1 RMS.

A structure described in Item 1 is an objective optical element which is used for an optical pickup apparatus for recording and/or reproducing information on a first optical information recording medium having a protective substrate with a thickness t1 using a first light flux with a wavelength λ1 emitted by a first light source, for recording and/or reproducing information on a second optical information recording medium having a protective substrate with a thickness t2 (t1≦t2) using a second light flux with a wavelength λ2 (λ1<λ2) emitted by a second light source and for recording and/or reproducing information on a third optical information recording medium having a protective substrate with a thickness t3 (t2<t3) using the third light flux (λ2<λ3) emitted by a third light source and for forming a converged spot on an information recording surface of each of the first through third optical information recording media. The objective optical element is provided with: a first phase structure for compensating a deterioration in a performance forming the converged spot on the information recording surface of the first optical information recording medium caused by an temperature change; a second phase structure for reducing a spherical aberration based on a thickness difference between the protective substrate t1 and the protective substrate t2 or a wavelength difference between the wavelength λ1 and the wavelength λ2; and a third phase structure for reducing a spherical aberration based on a thickness difference between the protective substrate t1 and the protective substrate t3.

In the structure described in Item 1, the first phase structure compensates temperature characteristics in the case of reproducing and/or recording of information for the first optical information recording medium, the second phase structure attains compatibility for reproducing and/or recording on the first optical information recording medium and the second optical information recording medium, and the third phase structure attains compatibility for reproducing and/or recording on the first optical information recording medium and the third optical information recording medium. Thereby, when the objective optical element has these three phase structures, compatibility for BD or HD as the first optical information recording medium, DVD as the second optical information recording medium and CD as the third optical information recording medium can be attained. It is further possible to control occurrence of spherical aberration caused by temperature changes which are remarkable on BD serving as the first optical information recording medium having large NA.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which:

Each of FIGS. 1(a) and 1(b) is a top view of primary portions showing a phase structure;

Figure 2:
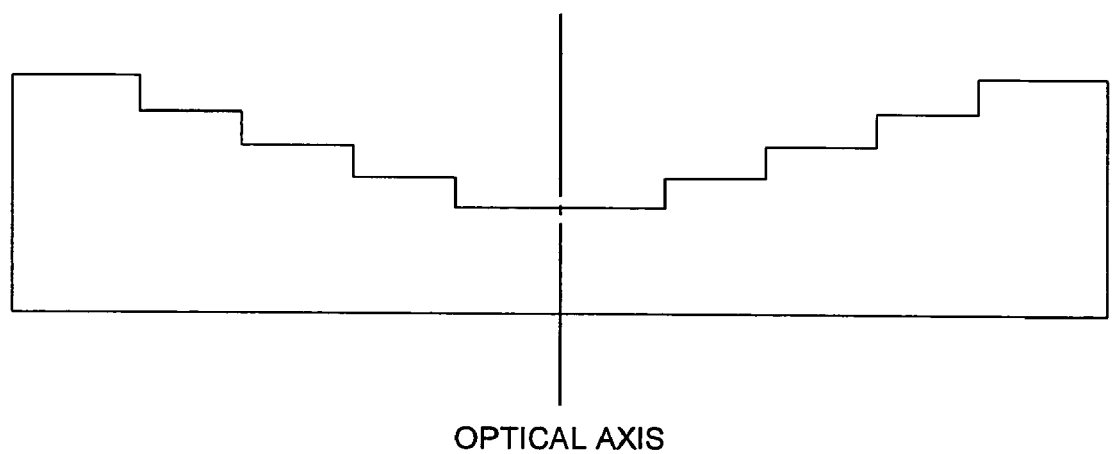
Figure 2:
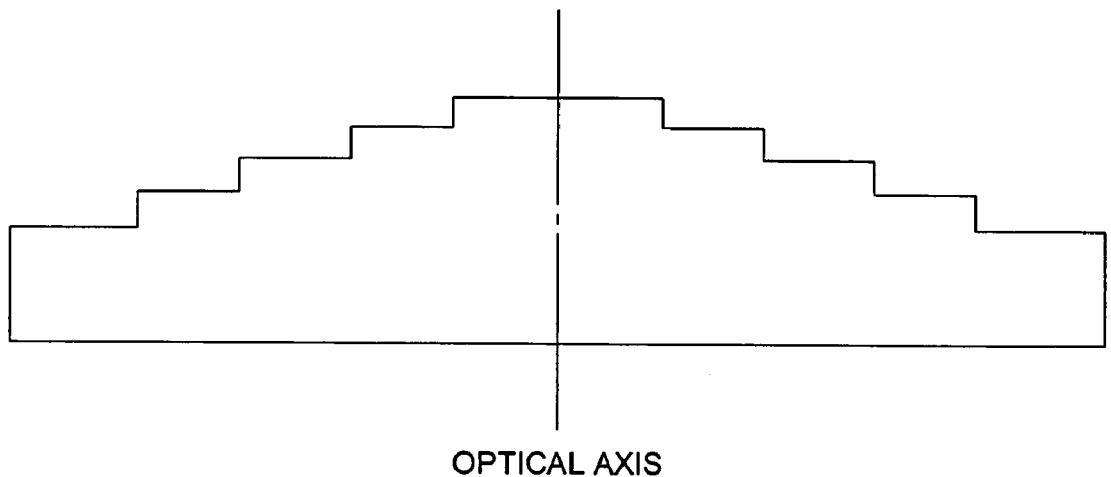
Figure 3:
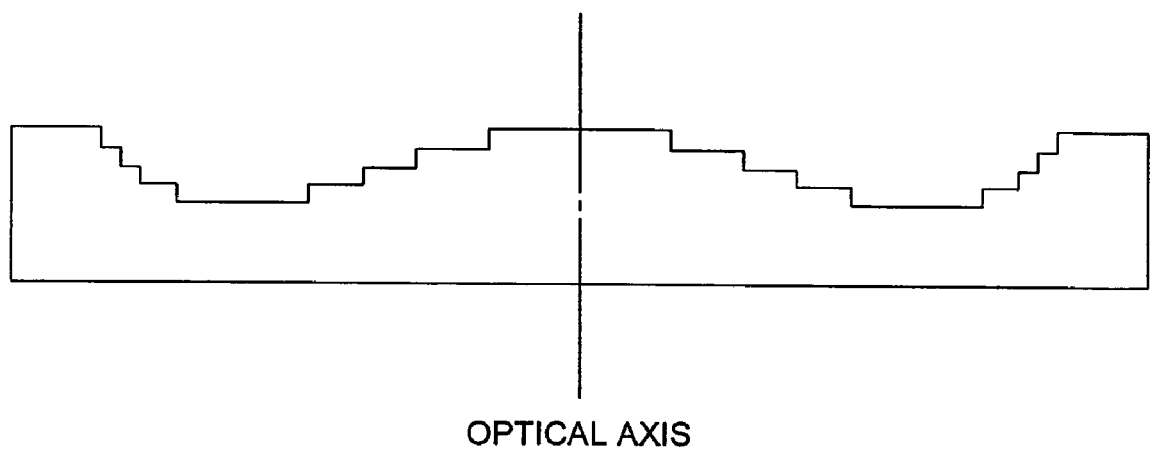
Figure 3:
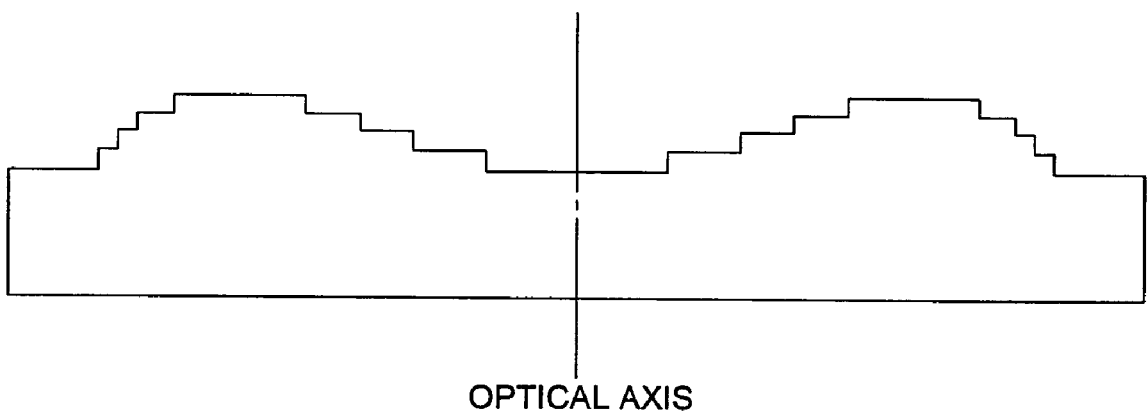
Figure 5:
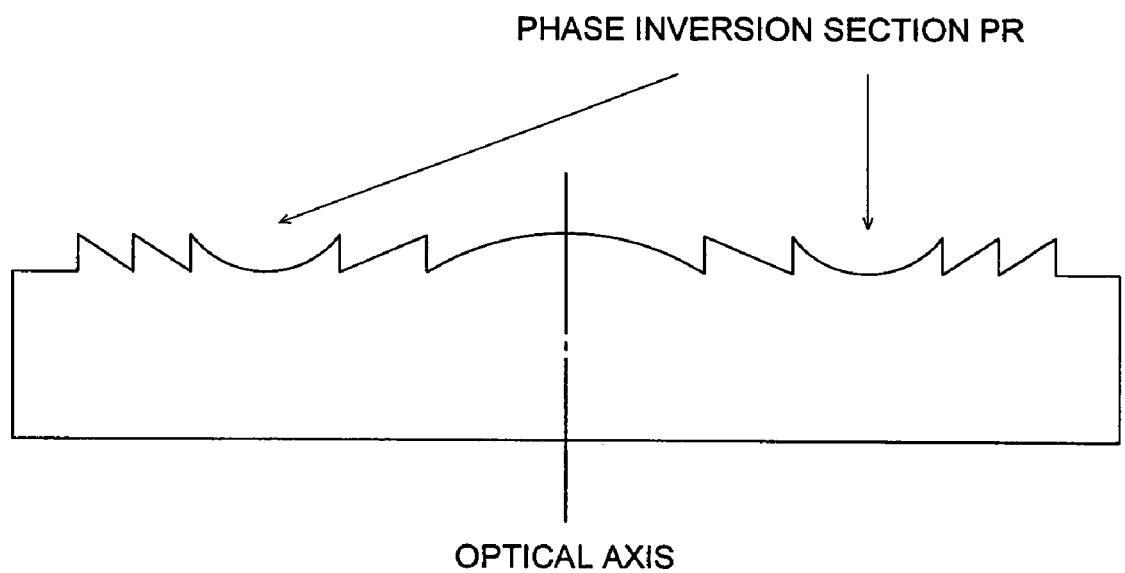
Figure 5:
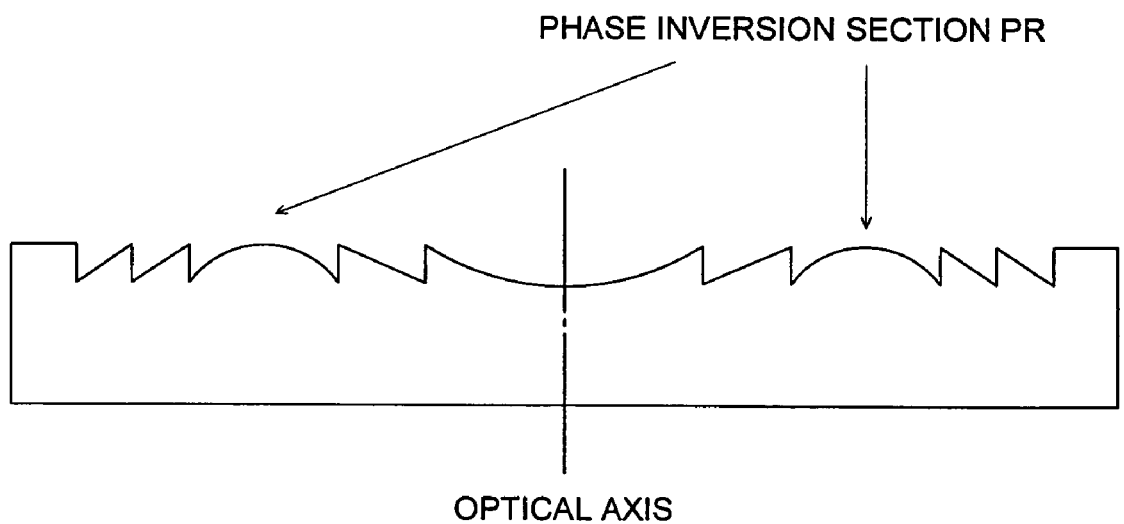
Figure 6:
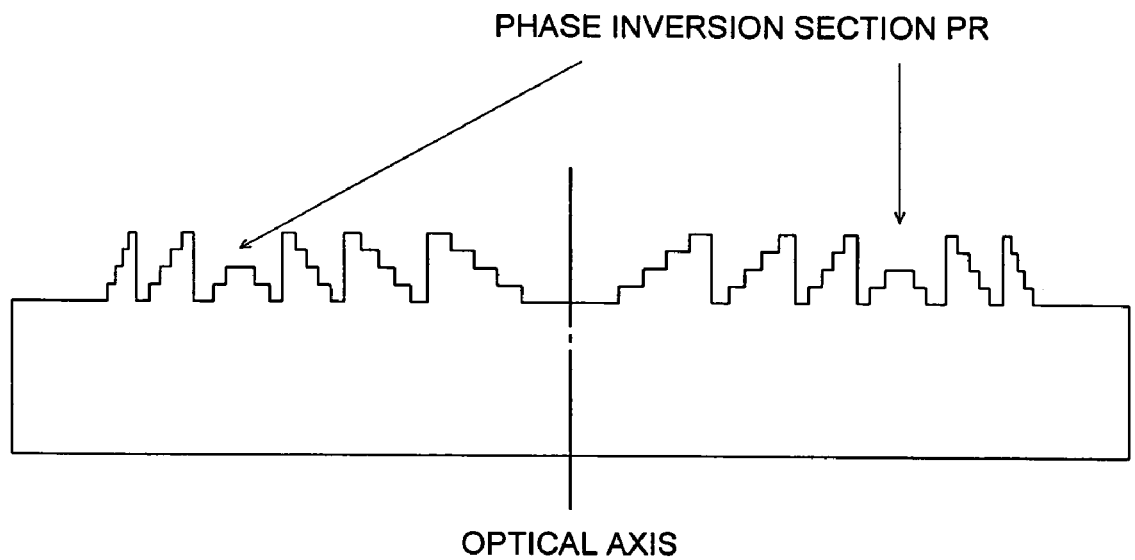
Figure 6:
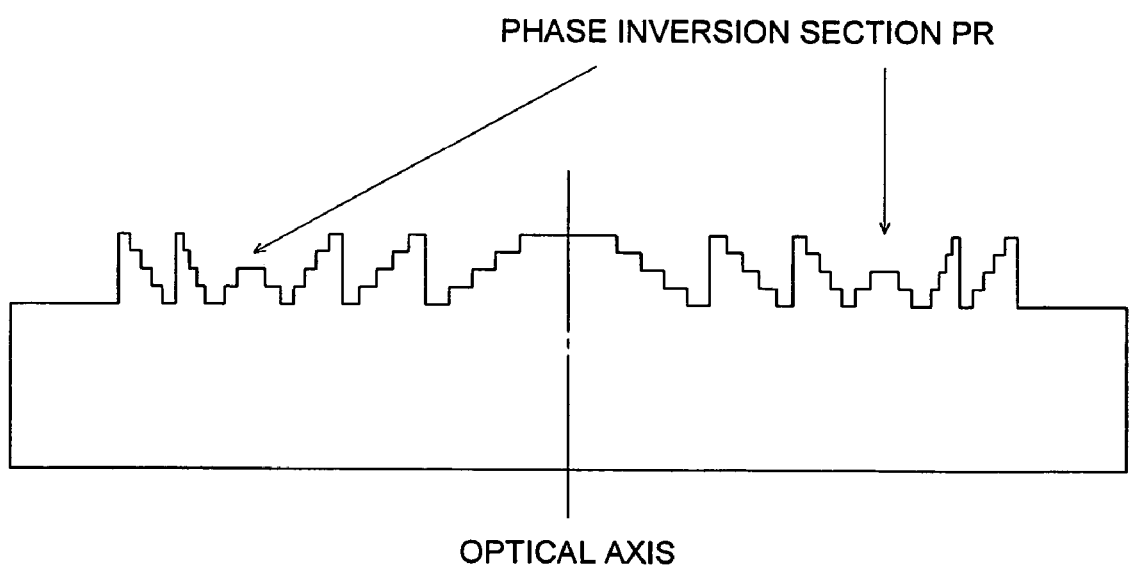
Figure 7:
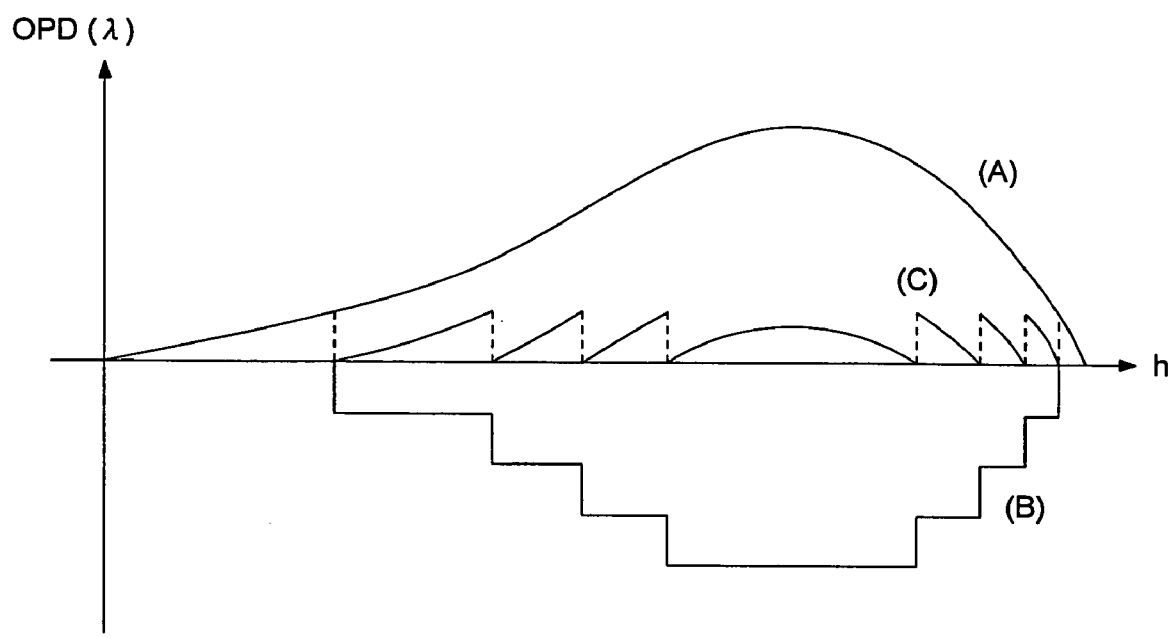
Figure 8:
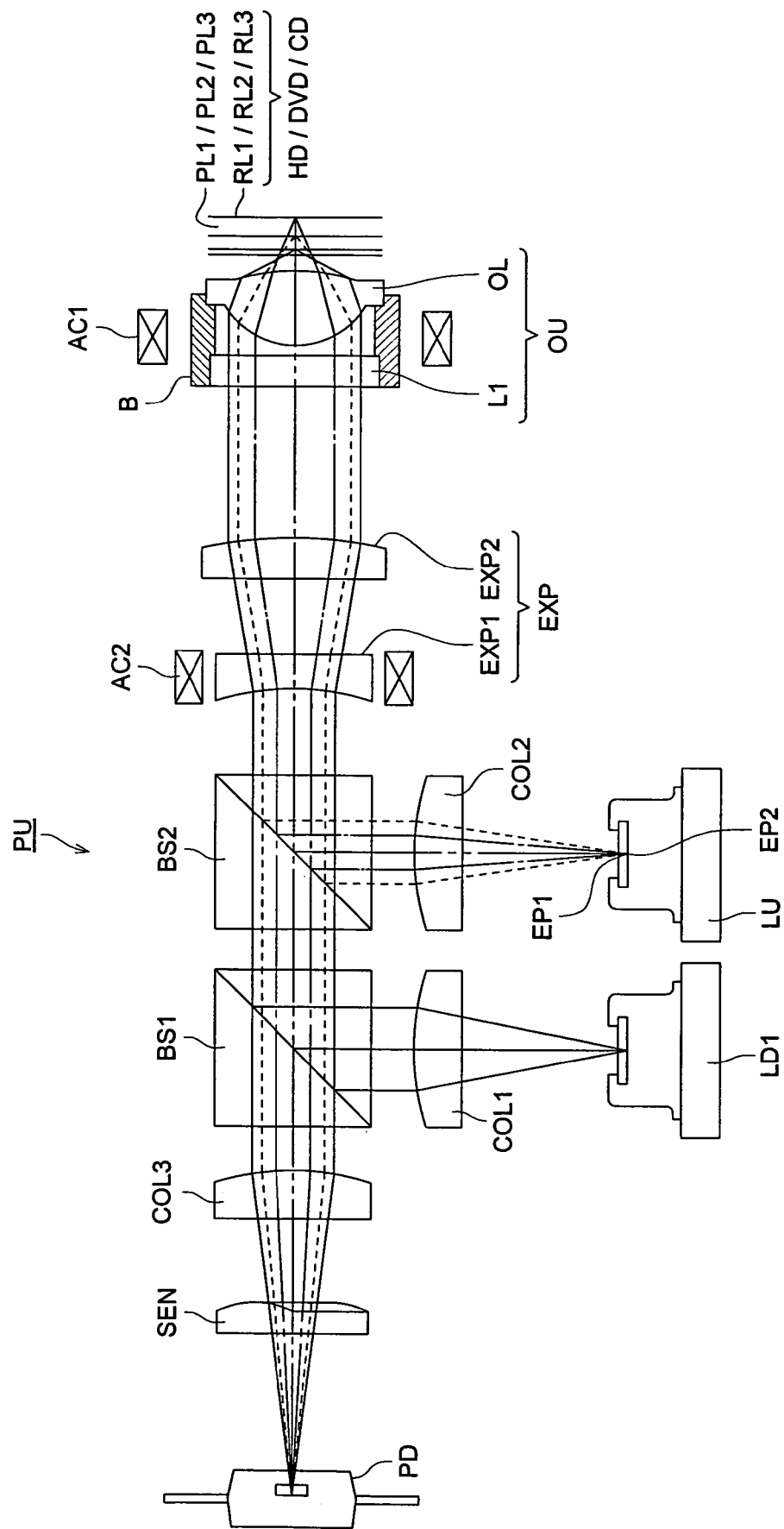
Figure 9:
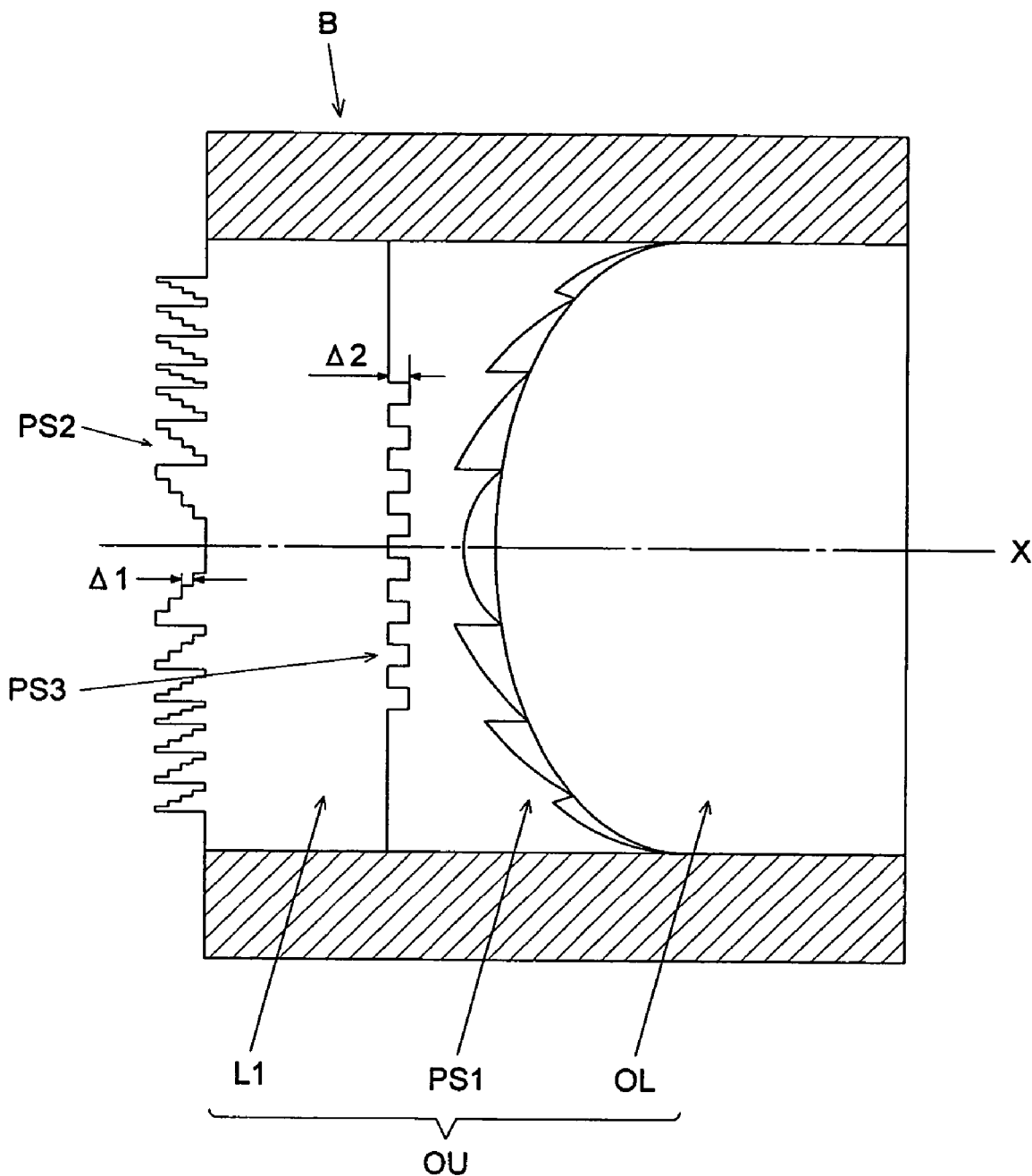
Figure 10:
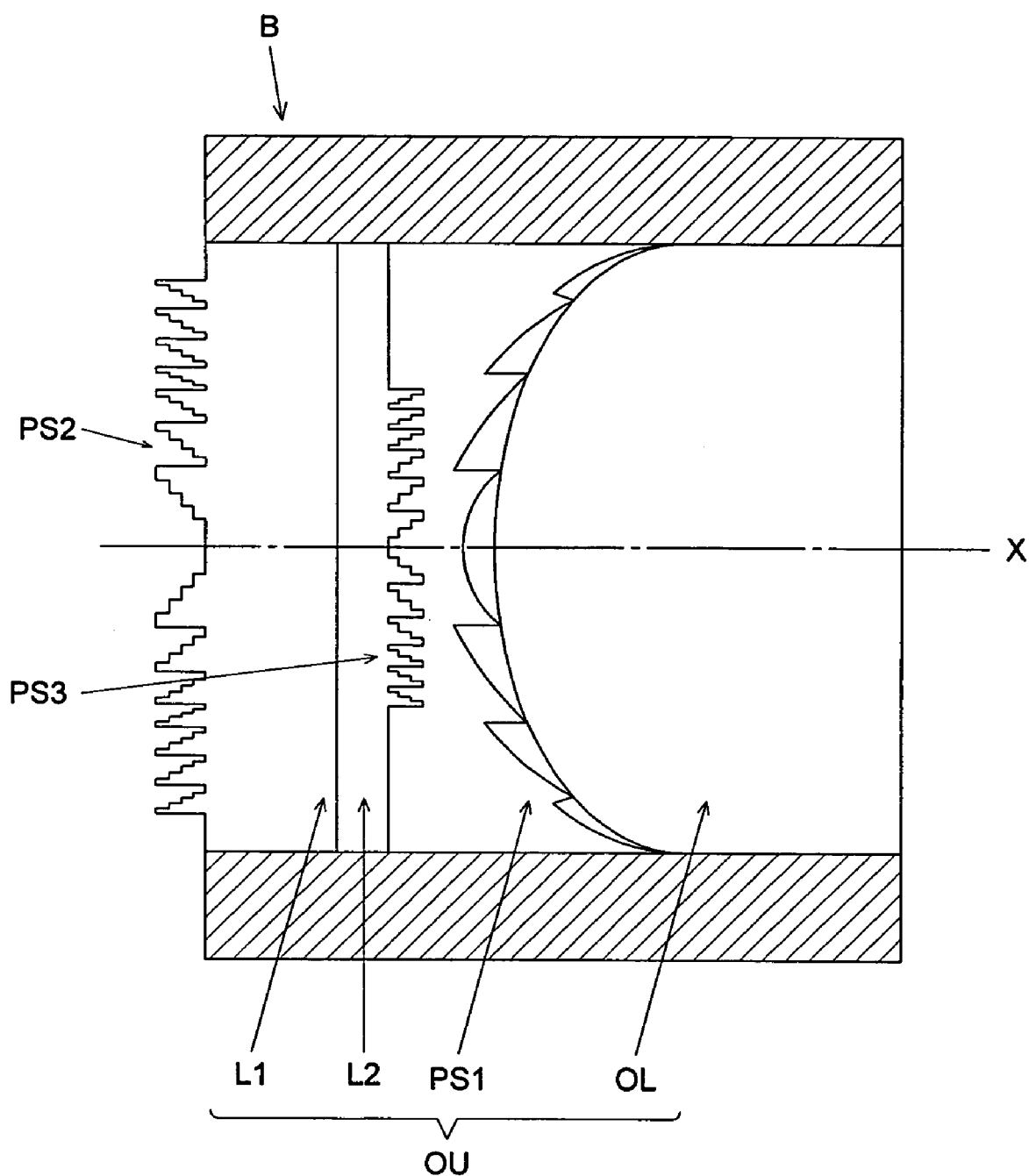
Figure 11:
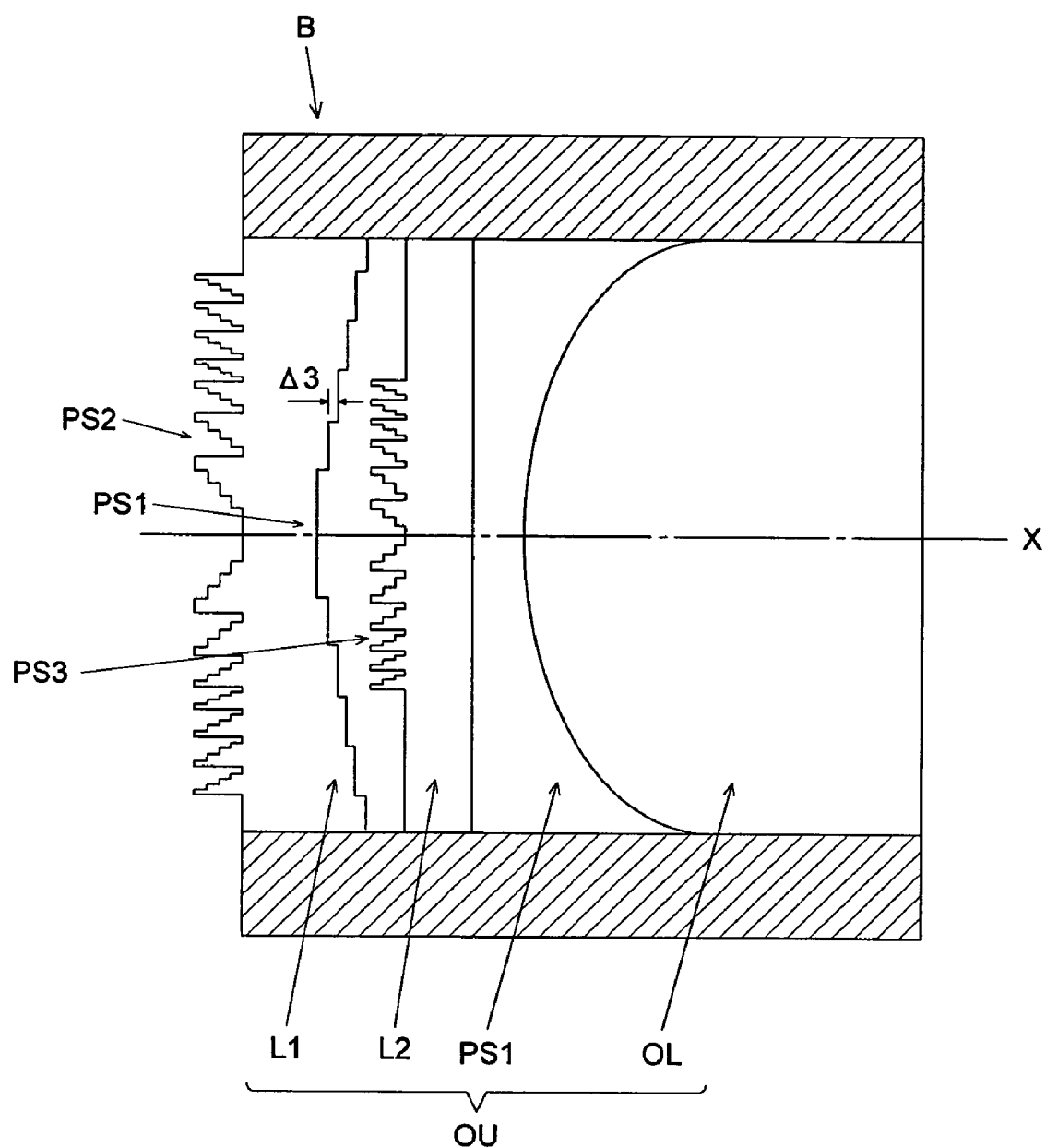
Figure 12:
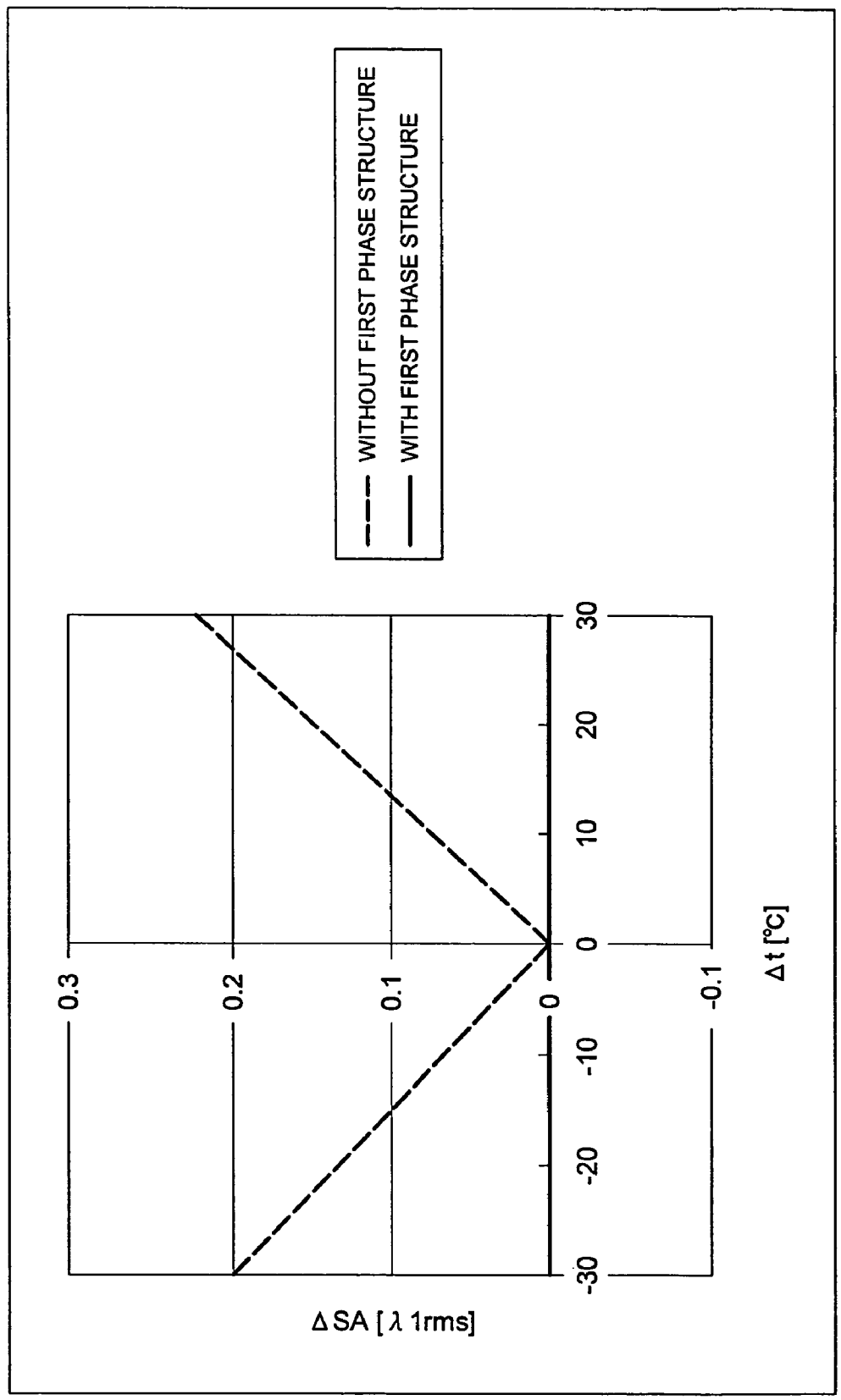
Figure 13:
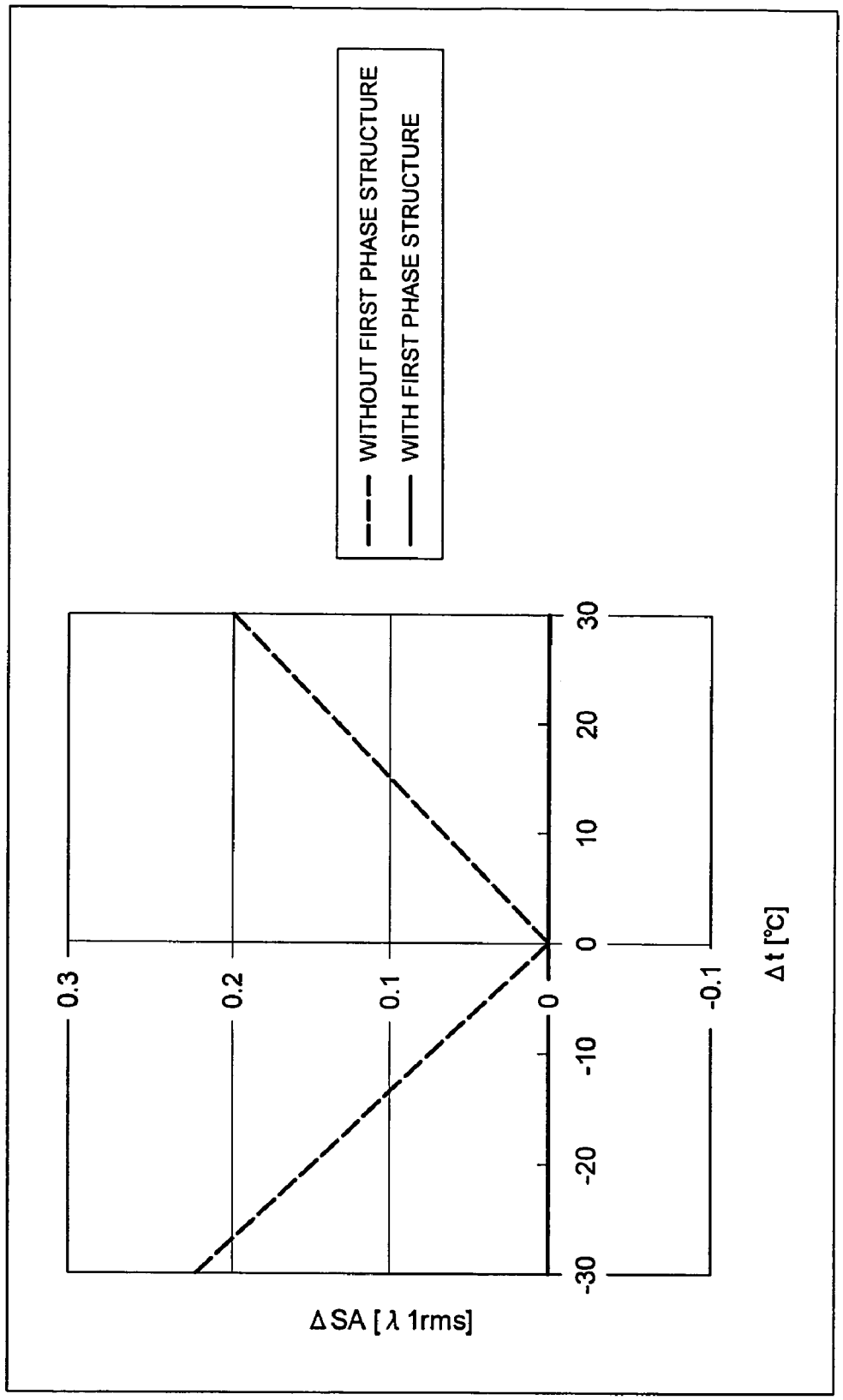

Each of FIGS. 2(a) and 2(b) is a top view of primary portions showing a phase structure;

Each of FIGS. 3(a) and 3(b) is a top view of primary portions showing a phase structure;

Each of FIGS. 4(a) and 4(b) is a top view of primary portions showing a phase structure;

Each of FIGS. 5(a) and 5(b) is a top view of primary portions showing a phase structure;

Each of FIGS. 6(a) and 6(b) is a top view of primary portions showing a phase structure;

FIG. 7 is a graph illustrating a principle of how aberration caused by temperatures is corrected by ring-shaped zone structure of the first phase structure;

FIG. 8 is a top view of primary portions showing an optical pickup apparatus;

FIG. 9 is a top view of primary portions showing a structure of an objective optical element;

FIG. 10 is a top view of primary portions showing a structure of an objective optical element;

FIG. 11 is a top view of primary portions showing a structure of an objective optical element;

FIG. 12 is a graph illustrating an effect of compensation for temperature characteristics by the first phase structure for HD; and FIG. 13 is a graph illustrating an effect of compensation for temperature characteristics by the first phase structure for HD.

DETAILED DESCRIPTION OF THE INVENTION

Preferred embodiments of the invention will be explained as follows.

A structure described in Item 2 is the objective optical element described in Item 1, wherein the first phase structure has a cross section including an optical axis whose shape is: a phase difference providing structure providing a longer optical path length on a farther position from the optical axis when the position is in a range from the optical axis to a predefined height on the phase difference providing structure and providing a shorter optical path length on a farther position from the optical axis when the position is higher than the predefined height from the optical axis on the phase difference providing structure; or a phase difference providing structure providing a shorter optical path length on a farther position from the optical axis when the position is in a range from the optical axis to a predefined height on the cross section on the phase difference providing structure and providing a longer optical path length on a farther position from the optical axis when the position is higher from the predefined height from the optical axis on the phase difference providing structure.

Figure 1:
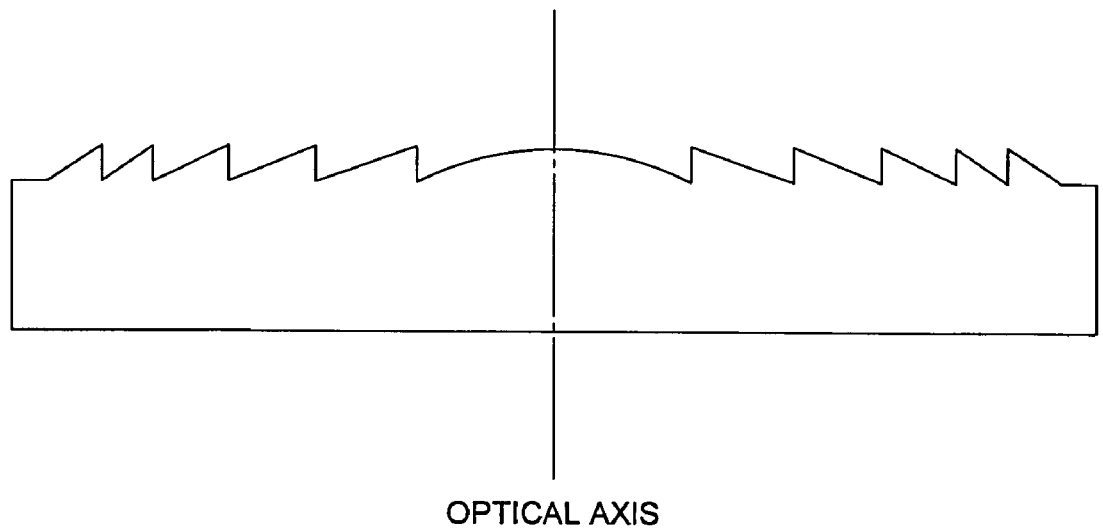
Figure 1:
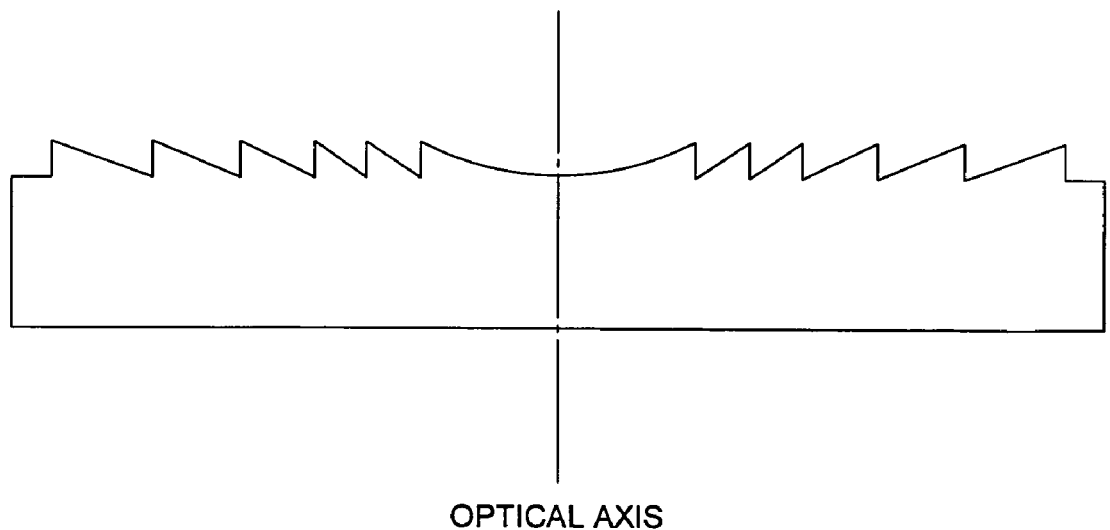

Each of the first—third phase structures can take various cross-sectional forms as shown schematically in FIG. 1(a)-FIG. 4(b). FIG. 1(a) and FIG. 1(b) represent a structure whose cross-sectional form is serrated, while, FIG. 2(a) and FIG. 2(b) represent a structure with a stepped form where all steps are in the same direction.

In the present specification, a structure that gives specific effect to the light flux by providing a prescribed phase difference for an incident light flux is assumed to be "a phase difference providing structure", and it means the structure whose cross section is serrated when the section is viewed on a plane including an optical axis, or whose cross section is in a stepped shape aligned in the optical axis direction, as shown, for example, in FIGS. 1(a) and 1(b) and FIGS. 2(a) and 2(b).

FIGS. 3(a) and 3(b) represent a structure in a stepped shape where the direction of the step is changed to be opposite on the half way. Namely, as described in Item 2, the structure of a phase difference providing structure has a cross-sectional form including the optical axis whose shape provides a longer optical path length at a farther position from the optical axis when the position is up to the predefined height from the optical axis of the phase structure, and providing the shorter optical path length at a farther position from the optical axis when the position is higher from the predefined height from the optical axis on the phase difference providing structure, or a phase difference providing structure has a cross-sectional form including the optical axis whose shape provides an shorter optical path length at a farther position when the position is from the optical axis up to the predefined height from the optical axis, and provides the greater optical path length at a farther position from the optical axis when the position is higher from the predefined height from the optical axis on the phase difference providing structure.

FIGS. 4(a) and 4(b) represent a structure as described in Item 8 including a plurality of patterns arranged concentrically, and each of the plurality of patterns has a cross section including an optical axis in a stepped shape with a plurality of levels. Each step of the stepped shape is shifted by height equivalent to the number of steps (4 steps in FIGS. 4(a) and 4(b)) corresponding to the number of levels, for each number of prescribed level (5 level surfaces in FIGS. 4(a) and 4(b)), which is also called "multi-level type" in the present specification.

Figure 4:
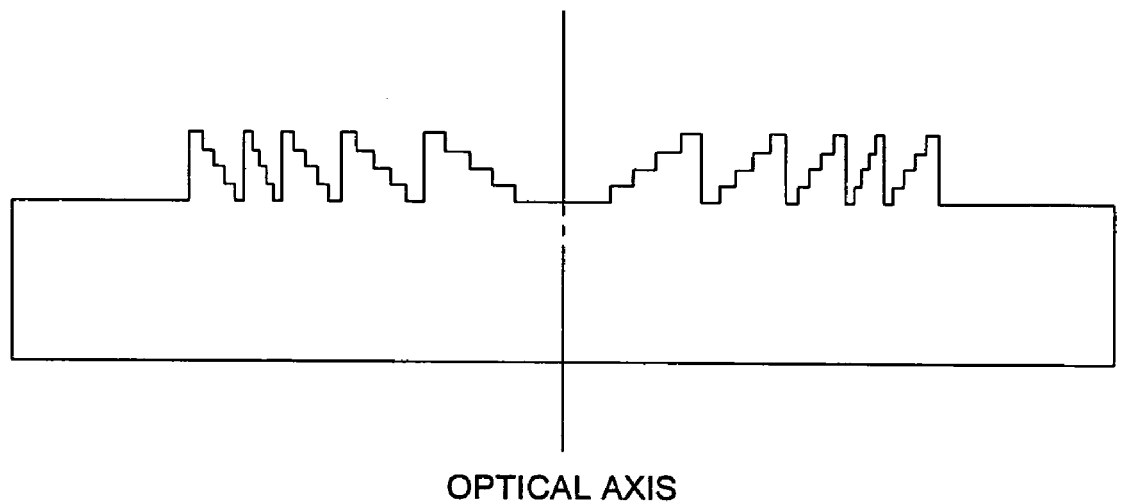
Figure 4:
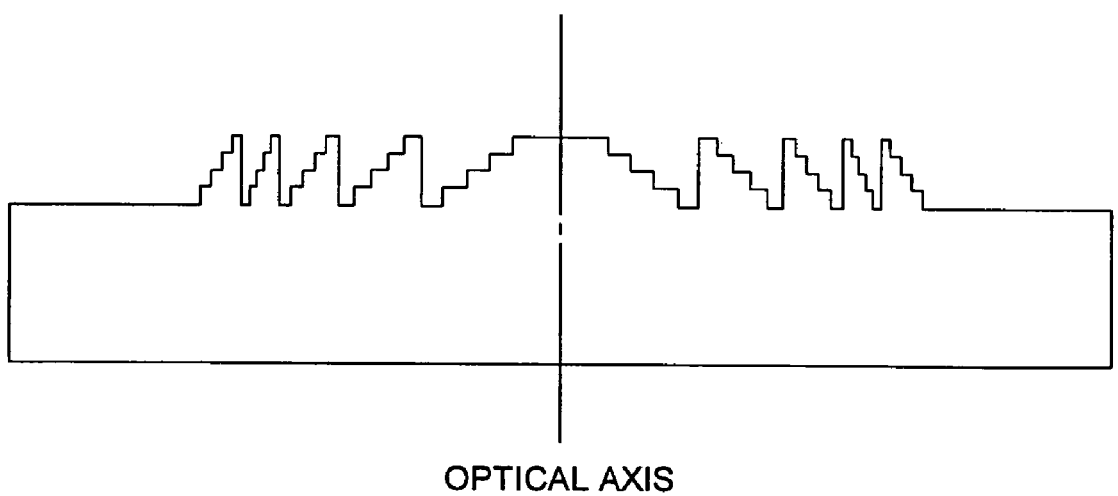

As a phase difference providing structure, FIGS. 1(a) and 1(b) indicate a structure such that directions of respective saw teeth are the same and FIGS. 4(a) and 4(b) indicate a structure such that directions of respective patterns on which the cross-sectional form is made to be a stepped shape, are same. However, the phase difference providing structure may provide a structure including phase inversion section PR, a serration whose direction is opposite to the direction of a serration that is positioned to be closer to the optical axis than phase inversion section PR, or a pattern whose direction is opposite to the direction of a pattern that is positioned to be closer to the optical axis than phase inversion section PR, as shown in FIGS. 5(a) and 5(b) and FIGS. 6(a) and 6(b). Incidentally, each of FIG. 1(a) through FIG. 6(b) represents a structure such that each structure is formed on a plane, and each structure may be formed either on a spherical surface or on an aspheric surface. Though the prescribed number of level surfaces is made to be 5 in FIGS. 4(a), 4(b), 6(a) and 6(b), the invention is not limited to this.

There will be explained a principle of how temperature aberration caused by ring-shaped zone structure of the first phase structure determined as in Item 2 is corrected.

Line (A) in FIG. 7 shows the state of a wavefront in the case where a temperature rises from the design basis temperature of a single lens having two optical surfaces each being an aspheric surface, and the axis of abscissas represents an effective radius of the optical surface, while, the axis of ordinates represents an optical path difference.

On the single lens, spherical aberration is caused by an influence of refractive index changes which accompany a temperature rise, and wavefront changes as shown by line (A). When the single lens is made of resin, in particular, an amount of spherical aberration generated grows greater, because a change in refractive index accompanying temperature changes is great.

Further, line (B) shows an optical path difference added to transmitted wavefront by the ring-shaped zone structure determined as in Item 2, and line (C) is a diagram indicating the state of wavefront that has been transmitted through the ring-shaped zone structure and the single lens. It is understood from the line (B) and line (C) that the wavefront that has been transmitted through the ring-shaped zone structure and the wavefront of the single lens in the case where a temperature rises from the design basis temperature cancel each other. Whereby, the wavefront of the laser beam converged on an information recording surface of the optical disc turns out to be excellent wavefront that is free from optical path difference when it is observed macroscopically, and temperature aberration of the single lens can be corrected by the ring-shaped zone structure.

A structure described in Item 3 is the objective optical element described in Item 2, wherein an area in the first phase structure providing a same phase to a phase at the predefined height of the first phase structure includes a position which is at 70% of an effective light flux diameter of the first light flux.

Since the change of the wavefront accompanying temperature change becomes maximum in the vicinity of 70% of an effective light flux diameter, if the ring-shaped zone representing the turn of the phase structure as in Item 3, namely, the area providing the same phase as the phase (optical path difference) at the position of the prescribed height is established to include the position of 70% of the effective light flux diameter, the effect of improving temperature characteristics can be expected extremely.

A structure described in Item 4 is the objective optical element described in Item 1, wherein the first phase structure is a phase difference providing structure which generates $\alpha 1$-th order diffracted light flux having a maximum diffraction efficiency among diffracted light fluxes generated when the first light flux enters into the first phase structure. The first phase structure further generates $\beta 1$-th ($\beta 1 < \alpha 1$) order diffracted light flux having a maximum diffraction efficiency among diffracted light fluxes generated when the second light flux enters into the first phase structure. The first phase structure further generates $\gamma 1$-th ($\gamma 1 \leq \beta 1$) order diffracted light flux having a maximum diffraction efficiency among diffracted light fluxes generated when the third light flux enters into the first phase structure.

In the structure described in Item 4, it is possible to cause the first phase structure to have an effect (temperature characteristic compensation) as that in Item 1, and high transmittance can be secured for each of three light fluxes. Incidentally, the diffractive structure having the diffraction characteristics of this kind may either be of a serration type in terms of a cross-sectional form including an optical axis, or be of a stepped structure in which an optical path length becomes longer as it is farther from the optical axis or in which an optical path length becomes shorter as it is farther from the optical axis.

A structure described in Item 5 is the objective optical element described in any one of Item 2-Item 4, wherein a cross section including an optical axis of the phase difference providing structure has a stepped structure.

A structure described in Item 6 is the objective optical element described in Item 5, wherein the first phase structure satisfies following expressions:

$p=INT(d(n1-1)/\lambda 1)$, $q=INT(d(n3-1)/\lambda 3)$ and $p>q$, where d is a step amount of the first phase structure, n1 is a refractive index of a medium of the first phase structure for the first light flux, n3 is a refractive index of a medium of the first phase structure for the third light flux, and Int(X) is an integer value closest to X.

In the structure described in Item 6, high transmittance can be secured for each of three light fluxes, when the first phase structure satisfies the aforesaid conditions.

A structure described in Item 7 is the objective optical element described in Item 1 wherein the second phase structure is a diffractive structure that does not diffract the first and the third light fluxes but diffracts the second light flux.

By making the second phase structure to be the diffractive structure that diffracts only the second light flux selectively as in Item 7, it is possible to control aberration for the second light flux independently, and excellent light-converging characteristics for both of the first information recording medium and the second information recording medium can be obtained.

A structure described in Item 8 is the objective optical element described in Item 7, wherein the second phase structure is a structure including a plurality of patterns arranged concentrically. Each of the plurality of patterns has a cross section including an optical axis in a stepped shape with a plurality of levels. Each step of the stepped shape is shifted by height of steps corresponding to a predefined number A of the plurality of levels for every predefined number A of the levels.

In the structure described in Item 8, it is possible to make the second phase structure to have diffraction characteristics as shown in Item 7.

A structure described in Item 9 is the objective optical element described in Item 8 wherein the number A of the prescribed level surfaces is any one of 4, 5 and 6.

In the structure described in Item 9, high transmittance can be secured for each of three light fluxes. Incidentally, for securing the highest transmittance for three light fluxes, it is preferable that the number A of the prescribed level is made to be 5.

A structure described in Item 10 is the objective optical element described in Item 8 or Item 9, wherein an amount of an optical path difference generated by one of the steps is twice of the first wavelength $\lambda 1$.

In the structure described in Item 10, high transmittance can be secured for each of three light fluxes.

The expression "an optical path difference generated by one of the steps is twice of the first wavelength $\lambda 1$" in this case also means a structure in which the optical path difference is 1.9-2.1 times the first wavelength $\lambda 1$, in addition to a structure in which the optical path difference is just twice the first wavelength $\lambda 1$.

A structure described in Item 11 is the objective optical element described in any one of Item 7-Item 10 wherein the second phase structure satisfies 40<vd2<70, where $\lambda d2$ is an Abbe number of a medium of the second phase structure.

In the structure described in Item 11, high transmittance can be secured for each of three light fluxes.

A structure described in Item 12 is the objective optical element described in Item 1, wherein the second phase structure is a diffractive structure that generates $\alpha 2$-th order diffracted light flux having a maximum diffraction efficiency among diffracted light fluxes generated when the first light flux enters into the first phase structure. The second phase structure is a diffractive structure that further generates $\beta 2$-th ($\beta 2 < \alpha 2$) order diffracted light flux having a maximum diffraction efficiency among diffracted light fluxes generated when the second light flux enters into the first phase structure. The second phase structure is a diffractive structure that further generates $\gamma 2$-th ($\gamma 2 \leq \beta 2$) order diffracted light flux having a maximum diffraction efficiency among diffracted light fluxes generated when the third light flux enters into the first phase structure.

In the structure described in Item 12, it is possible to cause the second phase structure to have an effect like that in Item 1, and high transmittance can be secured for each of three light fluxes. Incidentally, the diffractive structure having the diffraction characteristics of this kind may either be of a serration type in terms of a cross-sectional form including an optical axis, or be of a stepped structure in which an optical path length becomes longer as it is farther from the optical axis or in which an optical path length becomes shorter as it is farther from the optical axis.

A structure described in Item 13 is the objective optical element described in Item 1, wherein the third phase structure is a diffractive structure that does not diffract the first and the second light fluxes but diffracts the third light flux.

In the structure described in Item 13, by making the third phase structure to be the diffractive structure that diffracts only the third light flux selectively, it is possible to control aberration for the third light flux independently, and excellent light-converging characteristics for both of the first information recording medium and the third information recording medium can be obtained.

A structure described in Item 14 is the objective optical element described in Item 13, wherein the third phase structure is a structure including a plurality of patterns arranged concentrically. Each of the plurality of patterns has a cross section including an optical axis in a stepped shape with a plurality of levels. Each step of the stepped shape is shifted by height of steps corresponding to a predefined number B of the plurality of levels for every predefined number B of the levels.

In the structure described in Item 14, it is possible to make the third phase structure to have diffraction characteristics as shown in Item 13.

A structure described in Item 15 is the objective optical element described in Item 14 wherein the third phase structure satisfies 40<vd3<70, where vd3 is an Abbe number of a medium of the third phase structure and the predefined number B of the levels is 2.

A structure described in Item 16 is the objective optical element described in Item 15, wherein an amount of an optical path difference generated by one of the steps of the step structure is five times of the first wavelength $\lambda 1$.

The expression saying "an optical path difference generated by one of the steps is five times of the first wavelength $\lambda 1$" in this case also means a structure such that the optical path difference is 4.9-5.1 times the first wavelength $\lambda 1$, in addition to a structure in which the optical path difference is just five times the first wavelength $\lambda 1$.

In the structure described in Item 15, high transmittance can be secured for each of the first and second optical information recording media for which the speeding up of recording and reproducing speed is required. This effect becomes remarkable by making an optical path difference generated by one step of the stairs to be 5 times the first wavelength $\lambda 1$ as in Item 16.

A structure described in Item 17 is the objective optical element described in Item 14 wherein the third phase structure satisfies 24<vd3<', where vd3 is an Abbe number of a medium of the third phase structure and the predefined number B of levels is 3.

A structure described in Item 18 is the objective optical element described in Item 17, wherein an amount of an optical path difference generated by one of the steps of the step structure is five times or seven times of the first wavelength $\lambda 1$.

In the structure described in Item 17, high transmittance can be secured for each of three light fluxes. Further, this effect is more notable when the optical path difference generated by one of the steps of the step structure is seven times of the first wavelength $\lambda 1$ as the structure described in Item 18.

A structure described in Item 19 is the objective optical element described in Item 14, wherein the third phase structure satisfies 20<vd3<26, where vd3 is an Abbe number of a medium of the third phase structure and the predefined number B of levels is 4.

A structure described in Item 20 is the objective optical element described in Item 19, wherein an amount of an optical path difference generated by one of the steps of the step structure is seven times of the first wavelength $\lambda 1$.

In the structure described in Item 19, high transmittance can be secured for each of three light fluxes. Further, this effect is more notable when the optical path difference generated by one of the steps of the step structure is seven times of the first wavelength $\lambda 1$ as the structure described in Item 20.

A structure described in Item 21 is the objective optical element described in Item 1 wherein the third phase structure is a diffractive structure which generates $\alpha 3$-th order diffracted light flux having a maximum diffraction efficiency among diffracted light fluxes generated when the first light flux enters into the third phase structure. The third phase structure is a diffractive structure which further generates $\beta 3$-th ($\beta 3 < \alpha 3$) order diffracted light flux having a maximum diffraction efficiency among diffracted light fluxes generated when the second light flux enters into the third phase structure. The third phase structure is a diffractive structure which further generates $\gamma 3$-th ($\gamma 3 \leqq \beta 3$) order diffracted light flux having a maximum diffraction efficiency among diffracted light fluxes generated when the third light flux enters into the third phase structure.

In the structure described in Item 21, it is possible to cause the third phase structure to have an effect like that in Item 1 by causing the third phase structure to have the diffraction characteristics stated above, and high transmittance can be secured for each of three light fluxes. Incidentally, the diffractive structure having the diffraction characteristics of this kind may either be of a serration type in terms of a cross-sectional form including an optical axis, or be of a stepped structure in which an optical path length becomes longer as it is farther from the optical axis, or in which an optical path length becomes shorter as it is farther from the optical axis.

A structure described in Item 22 is the objective optical element described in Item 21 wherein the third phase structure satisfies $20 < vd3 < 40$, where vd3 is an Abbe number of a medium of the third phase structure.

In the structure described in Item 22, high transmittance can be secured for each of three light fluxes.

A structure described in Item 23 is the objective optical element described in Item 22 wherein the $\alpha 3$ is an odd number.

In the structure described in Item 23, high transmittance can be secured for each of three light fluxes.

A structure described in Item 24 is the objective optical element described in any one of Items 1-23, wherein the objective optical element comprises a light converging optical element and an aberration correcting lens group.

A structure described in Item 25 is the objective optical element described in Item 24 that consists of two elements formed in two groups and including at least one light converging optical element.

In the structure described in Item 25, it is possible to make the objective optical element to have an effect as that in Item 1.

A structure described in Item 26 is the objective optical element described in Item 24, consisting of three elements formed in two groups and including at least a light converging optical element formed in one group, wherein one of the two groups includes two optical elements whose media are different from each other and which are attached each other.

In the structure described in Item 26, it is possible to make the objective optical element to have an effect as that in Item 1. It is further possible to secure higher transmittance for each of three light fluxes, by arranging a phase structure effectively on an optical surface of the attached optical elements.

A structure described in Item 27 is the objective optical element described in Item 24, consists of three elements formed in three groups and including at least one light converging optical element.

In the structure described in Item 27, it is possible to make the objective optical element to have an effect as that in Item 1. It is further possible to secure higher transmittance for each of three light fluxes, by arranging a phase structure effectively on each optical surface of the optical element of the three groups.

A structure described in Item 28 is the objective optical element described in any one of Items 24-27, wherein at least the light-converging optical element is formed of resin.

A structure described in Item 29 is the objective optical element described in any one of Items 24-27, wherein each of the elements of the objective optical element is formed of a resin material.

In the structure described in Item 28, by making the light-converging optical element among optical elements constituting the objective optical element to be made by resin whose specific gravity is generally smaller than glass, the total weight of the objective optical element is reduced. Thus, burdens on an actuator for focusing and tracking operations for the objective optical element can be reduced, resulting in realization of down sizing and cost reduction of the optical pickup apparatus.

It is further possible to realize cost reduction by mass production, because injection molding can be applied on optical elements which are formed of resin.

It is further possible to obtain greater effects by making all optical elements constituting the objective optical element to be formed of resin, as in a structure described in Item 29.

The optical elements formed of resin have disadvantages that changes in refractive indexes and changes in forms are great due to heat radiation from an actuator, and an amount of generation of spherical aberration caused by temperature changes is great. However, in the present invention, temperature characteristics in the case of conducting reproducing and/or recording of information for the first optical information recording medium in the first phase structure are compensated, which settles the disadvantages stated above.

A structure described in Item 30 is an optical pickup apparatus provided with: a first light source for emitting a first light flux with a wavelength $\lambda 1$ for recording and/or reproducing information on a first optical information recording medium having a protective substrate with a thickness t1; a second light source for emitting a second light flux with a wavelength $\lambda 2$ ($\lambda 1 < \lambda 2$) for recording and/or reproducing information on a second optical information recording medium having a protective substrate with a thickness t2 (t1<t2); a third light source for emitting a third light flux ($\lambda 2 < \lambda 3$) for recording and/or reproducing information on a third optical information recording medium having a protective substrate with a thickness t3 (t2<t3); and the objective optical element described in any one of Items 1-29.

In a structure described in Item 30, the same effect as in any Item in Items 1-29 can be obtained.

A structure described in Item 31 is an optical disc drive apparatus, provided with: the optical pickup apparatus described in Item 30; and a moving unit for moving the optical pickup apparatus in a radius direction of each of the first to third optical information recording media.

In a structure described in Item 31, the same effect as in Item 30 can be obtained.

In the present invention, spherical aberration caused by a difference of protective layer thickness for a high density optical disc, DVD and CD or spherical aberration caused by a difference of working wavelength for a high density optical disc, DVD and CD can be corrected properly by the function of the phase structure. Further, high light utilization efficiency can be obtained in any of the violet wavelength area in the vicinity of 400 nm, the red wavelength area in the vicinity of 650 nm and the infrared area in the vicinity of 780 nm in the present invention. Further, an objective optical element excellent in temperature characteristics, an optical pickup apparatus having the objective optical element and an optical disc drive apparatus equipped with the optical pickup apparatus are obtained in the present invention.

For the resin objective optical elements (a converging optical element, an aberration correcting lens, and so on) in the present invention, various kinds of resin which is generally used for optical applications such as a lens, can be used. Particularly, it is preferable that resin including a polymer which has alicyclic structure is used, and it is more preferable that cyclic olefin type resin is used among the above described resin.

Moreover, athermal resin as described below can also be used as the above resin material.

There is known athermal resin as a material such that microparticles with diameter of 30 nm or below are dispersed in resin for base material. Since the athermal resin has a characteristic that its refractive index change to a temperature change is smaller than that of resin for typical optical application, it allows that a phase structure of the optical element has less power to improve a temperature characteristics of the optical element. Therefore, it further allows to reduce deterioration of the wavelength characteristics caused by the phase structure, to enlarge the design degree of freedom of the optical element, and to extended the tolerance of a manufacture error or assembly precision.

In general, when microparticles are mixed with transparent resin materials, light scattering is caused and transmittance is lowered, which has made it difficult to use as an optical material. However, it has become clear that occurrence of scattering can be prevented substantially, by making microparticles to be smaller than a wavelength of transmitted light flux.

Herein, it is preferable that the above resin material is a resin material in which microparticles having larger change rate of refractive index than change rate of refractive index of the resin for the base material and having mean particle diameter of 30 nm or less, are dispersed. Besides, when the change rate of refractive index of the resin as the base material has negative value, "larger change rate of refractive index" includes both of a change rate with a negative value being closer to 0 than the change rate of the resin of the base material or a change rate with a positive value.

Temperature rise makes the refractive index low in a resin material, but it is also knows that the change of the refractive index can be reduced by dispersing and mixing inorganic particles into the resin material.

Concretely, the change which has been about $-1.2 \times 10^{-4}$ in the past is controlled preferably to be less than $8 \times 10^{-5}$ in an absolute value, more preferably to be less than $6 \times 10^{-5}$ in an absolute value, much more preferably to be less than $4 \times 10^{-5}$ in an absolute value. As for a material of the optical element, by using a resin for the base material including a material in which microparticles with diameter of 30 nm or less, preferably 20 nm or less, more preferably 10-15 nm are dispersed in the resin for the base material, an optical element with no or reduced temperature sensitivity of a refractive index can be provided.

For example, microparticles of niobium oxide ($Nb_2O_5$) are dispersed in acrylic resins. The volume ratio of the resin for the basic material is about 80% and that of niobium oxide is about 20%, and these are mixed uniformly. Though microparticles have a problem that they tend to cohere, the necessary state of dispersion can be kept by a technology to disperse particles by giving electric charges to the surface of each particle. Microparticles made of silicon oxide ($SiO_2$) may be used instead of those of niobium oxide.

It is preferable that mixing and dispersing of resins and microparticles are conducted on an inline basis in the course of injection molding of an optical element. In other words, it is preferable that the mixed and dispersed material is not cooled nor solidified, because the material is to be molded into an optical element (lens) at the next process.

Incidentally, for controlling a rate of change of the refractive index for temperature, the above described volume ratio can be raised or lowered properly, and it is also possible to blend and disperse plural types of inorganic microparticles.

Though a volume ratio of acrylic resins to niobium oxide is made to be 80:20, namely, to be 4:1, in the example stated above, it is possible to be adjusted properly within a range from 90:10 (9:1) to 40:60 (2:3). It is preferable that an amount of niobium oxide is increased such that the ratio becomes more than 9:1, because an effect of restraining temperature change sensitivity becomes small. While, It is preferable that an amount of niobium oxide is reduced such that the ratio becomes less than 2:3, because it prevents a problem on moldability of resins.

It is preferable that the above microparticles are inorganic substances, and it is more preferable to be oxides. It is preferable that the state of oxidation is saturated, and the oxides are not oxidized any more.

The microparticles with the inorganic substance are preferable, because they restrains a reaction to the resin for the base material being a high molecular organic compound can be restrained. Further, microparticles being oxides can prevent deterioration caused when the optical elements is used, for example, a laser beam is irradiated to the optical elements. Especially, under the severe conditions such as high temperatures and exposure to laser beam, oxidation tends to be accelerated. However, deterioration caused by oxidation can be prevented in microparticles of inorganic oxides. It is naturally possible to add antioxidant to prevent oxidation of resins caused by the other reasons.

Incidentally, as resin for the basic material, resin disclosed in TOKKAI Nos. 2004-144951, 2004-144953 and 2004-114954 can be used properly.

While the preferred embodiments of the present invention have been described using specific terms, such description is for illustrative purposes only, and it is to be understood that changes and variations may be made without departing from the sprit or scope of the appended claims.

EXAMPLES

First Embodiment

The first embodiment of the invention will be explained as follows, referring to the drawings. First, FIG. 8 is used for explaining the objective optical system of the invention and an optical pickup apparatus employing the objective optical system.

FIG. 8 is a diagram showing schematically the structure of optical pickup apparatus PU capable of conducting properly recording and reproducing of information properly for any of a high density optical disc, DVD and CD. In optical specifications of HD, the first wavelength $\lambda 1$ is 408 nm, thickness t1 of protective layer PL1 is 0.0875 mm and numerical aperture NA1 is 0.85, while, in optical specifications of DVD, the second wavelength $\lambda 2$ is 658 nm, thickness t2 of protective layer PL2 is 0.6 mm and numerical aperture NA2 is 0.60, and in optical specifications of CD, the third wavelength $\lambda 3$ is 785 nm, thickness t3 of protective layer PL3 is 1.2 mm and numerical aperture NA3 is 0.47. However, a combination of a wavelength, a thickness of the protective layer and a numerical aperture is not limited to the foregoing.

The optical pickup apparatus PU is provided with: violet semiconductor laser LD1 that emits a violet laser light flux (first light flux) which is emitted in the case of conducting recording and reproducing of information for HD and has a wavelength of 408 nm; laser light source unit LU for DVD and CD wherein first emission point EP1 that emits red laser light flux (second light flux) with a wavelength 658 nm when conducting recording and reproducing of information for DVD and second emission point EP2 that emits infrared laser light flux (third light flux) with a wavelength 785 nm when conducting recording and reproducing of information for CD are formed on one chip; photo-detector PD that is compatible for HD, DVD and CD; objective lens unit OU (objective optical element) that is composed of first aberration correcting lens L1 and light converging element OL having a function to converge a laser light flux transmitted through the first aberration correcting lens L1 on each of information recording surfaces RL1, RL2 and RL3; biaxial actuator AC1; uniaxial actuator AC2; expander lens EXP composed of first lens EXP1 whose paraxial refractive power is negative and of second lens EXP2 whose paraxial refractive power is positive; first polarizing beam splitter BS1; second polarizing beam splitter BS2; first collimator lens COL1; second collimator lens COL2; third collimator lens COL3 and sensor lens SEN that adds astigmatism to reflected light flux coming from each of information recording surfaces RL1, RL2 and RL3. Incidentally, in addition to the violet semiconductor laser LD1 stated above, a violet SHG laser can also be used as a light source for HD.

When conducting recording and reproducing of information for HD in the optical pickup apparatus PU, violet semiconductor laser LD1 is first operated to emit light, as its light path is drawn with solid lines on FIG. 8. After being converted into a collimated light flux by the first collimator lens COL1, a divergent light flux emitted from the violet semiconductor laser LD1 is reflected by the first polarizing beam splitter BS1, then, passes through the second polarizing beam splitter BS2, and is transmitted through the first lens EXP1 and the second lens EXP2 so that its diameter may be expanded, and is regulated in terms of a diameter of the light flux by an unillustrated diaphragm STO, to become a spot that is formed by objective lens unit OU on information recording surface RL1 through protective layer PL1 of HD. The objective lens unit OU is subjected to focusing and tracking conducted by biaxial actuator AC1 arranged around the objective lens unit.

A reflected light flux modulated by information pits on information recording surface RL1 is transmitted again through the objective lens unit OU, the second lens EXP2, the first lens EXP1, the second polarizing beam splitter BS2 and the first polarizing beam splitter BS1, then, passes through the third collimator lens COL3 to become a converged light flux, and is converged on a light-receiving surface of photodetector PD after being given astigmatism by sensor lens SEN. Thus, information recorded on HD can be read by the use of output signals of the photodetector PD.

Further, when conducting recording and reproducing of information for DVD in the optical pickup apparatus PU, emission point EP1 is operated to emit light. A divergent light flux emitted from the emission point EP1 is converted by the second collimator lens COL2 into a collimated light flux as its light path is drawn with broken lines in FIG. 8, then, is reflected by the second polarizing beam splitter BS2, and is transmitted through the first lens EXP1 and the second lens EXP2 so that its diameter may be expanded, to become a spot that is formed by objective lens unit OU on information recording surface RL2 through protective layer PL2 of DVD.

The objective lens unit OU is subjected to focusing and tracking conducted by biaxial actuator AC1 arranged around the objective lens unit.

A reflected light flux modulated by information pits on information recording surface RL2 is transmitted again through the objective lens unit OU, the second lens EXP2, the first lens EXP1, the second polarizing beam splitter BS2 and the first polarizing beam splitter BS1, then, passes through the third collimator lens COL3 to become a converged light flux, and is converged on a light-receiving surface of photodetector PD after being given astigmatism by sensor lens SEN. Thus, information recorded on DVD can be read by the use of output signals of the photodetector PD.

Further, when conducting recording and reproducing of information for CD in the optical pickup apparatus PU, the first lens EXP1 is driven by uniaxial actuator AC2 in the optical axis direction so that the distance between the first lens EXP1 and the second lens EXP2 may become smaller than that for conducting recording and reproducing of information for HD, and then, emission point EP2 is operated to emit light. A divergent light flux emitted from the emission point EP2 is converted by the second collimator lens COL2 into a gentle divergent light flux as its light path is drawn with one-dot chain lines in FIG. 8, then, is reflected by the second polarizing beam splitter BS2, and is transmitted through the first lens EXP1 and the second lens EXP2 so that its diameter may be expanded and it is converted into a divergent light flux, to become a spot that is formed by objective lens unit OU on information recording surface RL3 through protective layer PL3 of CD. The objective lens unit OU is subjected to focusing and tracking conducted by biaxial actuator AC1 arranged around the objective lens unit.

A reflected light flux modulated by information pits on information recording surface RL2 is transmitted again through the objective lens unit OU, the second lens EXP2, the first lens EXP1, the second polarizing beam splitter BS2 and the first polarizing beam splitter BS1, then, passes through the third collimator lens COL3 to become a converged light flux, and is converged on a light-receiving surface of photodetector PD after being given astigmatism by sensor lens SEN. Thus, information recorded on CD can be read by the use of output signals of the photodetector PD.

As shown schematically in FIG. 9, objective lens unit OU in the present embodiment is the structure with two elements in two groups wherein the first aberration correcting lens L1 that is made of resin and light-converging optical element OL that is made of resin on which an aspheric surface form is designed so that spherical aberration may be minimum for the first wavelength $\lambda 1$ and for thickness t1 of the protective layer PL1 of HD are united to be on the same axis through lens frame B. Specifically, the first aberration correcting lens L1 is fit and fixed in one end of the cylindrical lens frame B, and the light-converging optical element OL is fit and fixed in the other end, and these are united coaxially along optical axis X.

In the first aberration correcting lens L1, Abbe's number vd for d line is 55.0 and refractive index nd for d line is 1.55, while in the light-converging optical element OL, Abbe's number vd for d line is 55.0 and refractive index nd for d line is 1.55.

First phase structure PS1 is formed on an optical surface of the light-converging optical element OL on the light source side, second phase structure PS2 is formed on an optical surface of the first aberration correcting lens L1 on the light source side, and third phase structure PS3 is formed on an optical surface of the first aberration correcting lens L1 on the light source side.

The second phase structure PS2 does not diffract the first and third light fluxes and diffracts the second light flux, and it has the structure including patterns arranged concentrically. Each of the patterns has a cross-sectional form including an optical axis made to be a stepped shape with levels. Each step of the stepped shape is shifted by height of steps corresponding to a predefined number of levels (4 steps are shifted in the present embodiment) for every predefined number of the levels (5 levels in the present embodiment).

Each step amount $\Delta 1$ of the stepped structure is established to satisfy $\Delta 1=2\cdot\lambda 1/(n1-1)=1.44$ μm. In this case, n1 represents a refractive index of the first aberration correcting lens L1 in wavelength $\lambda 1$ ($\lambda 1=408$ nm in the present embodiment).

Since the optical path difference to be added to the first light flux by step amount $\Delta 1$ is $2\times\mu 1$, the first light flux is free from any actions of the second phase structure PS2, to be transmitted as it is.

Further, since the optical path difference to be added to the third light flux by step amount $\Delta 1$ is $1\times\lambda 3$ ($\lambda 3=785$ nm in the present embodiment), the third light flux is also free from any actions of the second phase structure PS2, to be transmitted as it is.

On the other hand, the optical path difference to be added to the second light flux by step amount $\Delta 1$ is $1.20\times\lambda 2$ ($\lambda 2=658$ nm in the present embodiment), and the phase of the second light flux passing through level surfaces before and behind the step $\Delta 1$ is shifted by $2\pi/5$. Since each serration is divided into 5 sections, an amount of shifting of the phase of the second light flux for one serration is just $5\times 2\pi/5=2\pi$, and the first order diffracted light flux is generated.

As stated above, the second phase structure PS2 diffracts only the second light flux selectively, and thereby, corrects spherical aberration caused by a difference of a protective layer thickness between HD and DVD.

Incidentally, diffraction efficiency for 0-order diffracted light (transmitted light) of the second light flux generated by the second phase structure PS2 is 100%, diffraction efficiency for first-order diffracted light of the second light flux is 87.5%, and diffraction efficiency for 0-order diffracted light (transmitted light) is 100%, and high diffraction efficiency is obtained for all light fluxes.

The third phase structure PS3 does not diffract the first and second light fluxes and diffracts the third light flux, and it is a structure including patterns arranged concentrically. Each of the patterns has a cross section including an optical axis in a stepped shape with levels. Each step of the stepped shape is shifted by height of steps corresponding to a predefined number of levels (1 step is shifted in the present embodiment) for every predefined number of the levels (2 levels in the present embodiment). Each step amount $\Delta 2$ of the stepped structure is established to satisfy $\Delta 2=5\cdot\lambda 1/(n1-1)=3.60$ μm. In this case, n1 represents a refractive index of the first aberration correcting lens L1 in wavelength $\lambda 1$.

Since the optical path difference to be added to the first light flux by step amount $\Delta 2$ is $5\times\lambda 1$, the first light flux is free from any actions of the third phase structure PS3, to be transmitted as it is. Further, since the optical path difference to be added to the second light flux by step amount $\Delta 2$ is $3\times\lambda 2$, the second light flux is also almost free from any actions of the third phase structure PS3, to be transmitted as it is. On the other hand, the optical path difference to be added to the third light flux by step amount $\Delta 2$ is about $2.5\times\lambda 3$, and the phase of the third light flux passing through level surfaces before and behind the step $\Delta 2$ is shifted by about $\pi/2$. Since each serration is divided into 2 sections, an amount of shifting of the phase of the third light flux for one serration is just $2\times\pi/2=\pi$, whereby, most of the amount of light of the third light flux entering the third phase structure PS3 are distributed into the first order diffracted light and—first order diffracted light. The third phase structure PS3 is designed to converge the first order diffracted light among them on information recording surface RL3 of CD.

As stated above, the third phase structure PS3 diffracts only the third light flux selectively, and thereby, corrects spherical aberration caused by a difference of a protective layer thickness between HD and CD. Incidentally, diffraction efficiency for 0-order diffracted light (transmitted light) of the first light flux generated by the third phase structure PS3 is 100%, diffraction efficiency for 0-order diffracted light (transmitted light) of the second light flux is 100%, and diffraction efficiency for the first-order diffracted light of the third light flux is 40.5%, thus, high diffraction efficiency is obtained for HD and DVD for which the speeding up of recording speed and reproducing speed is required.

The first phase structure is a diffractive structure whose cross-sectional form including an optical axis is in a form of serrations, and the diffractive structure is established to generate $(\alpha 1=2)^{th}$ order diffracted light when the first light flux enters the diffractive structure. Due to this, stable characteristics for recording and reproducing can be obtained, by using $(\alpha 1=2)^{th}$ order diffracted light of the first light flux, even in the case wherein a temperature of plastic light-converging optical element OL on which a phase structure is formed is changed by heat radiation from biaxial actuator AC1 and by changes in ambient temperatures, and a refractive index is greatly changed by temperature changes.

Further, the first phase structure PS1 is established so that $(\beta 1=1(\beta 1<\alpha 1))^{th}$ order diffracted light may be generated when the second light flux enters the first phase structure, and $(\gamma 1=1(\gamma 1\leq\beta 1))^{th}$ order diffracted light may be generated when the third light flux enters.

Diffraction efficiencies for $(\alpha 1=2)^{th}$ order diffracted light of the first light flux, $(\beta 1=1)^{th}$ order diffracted light of the second light flux and for $(\gamma 1=1)^{th}$ order diffracted light of the third light flux are 100%, 87.8% and 100% respectively, and high diffraction efficiency is obtained for any light flux.

Incidentally, the diffractive structure having the diffraction characteristics of this kind may be of the cross-sectional form including an optical axis that is in a form of serrations, or it may be a stepped structure provides a longer optical path length as a light flux passes farther position of the structure from the optical axis or provides a shorter optical path length as a light flux passes farther position of the structure from the optical axis.

In the objective optical element and the optical pickup apparatus related to the present embodiment, temperature characteristics for HD are compensated in the first phase structure PS1, compatibility between HD and DVD is achieved in the second phase structure PS2, compatibility between HD and CD can be achieved in the third phase structure PS3, and further, occurrence of spherical aberration caused by temperature changes which are remarkable on BD as the first optical information recording medium having large NA, in particular, can be controlled.

Incidentally, for example, if the second phase structure PS2 is formed only in numerical aperture NA2 of DVD, a light flux passing through an area outside NA2 becomes a flare component on information recording surface RL2 of DVD, which makes it possible form the structure wherein aperture restriction for DVD is carried out automatically.

Further, for example, if the third phase structure PS3 is formed only in numerical aperture NA3 of CD, a light flux passing through an area outside NA3 becomes a flare component on information recording surface RL3 of CD, which makes it possible form the structure wherein aperture restriction for CD is carried out automatically.

Incidentally, it is possible to correct spherical aberration of the spot formed on information recording surface RL1 of HD, by driving negative lens EXP1 of beam expander EXP in the optical axis direction by uniaxial actuator UAC. Causes of occurrence of spherical aberration to be corrected by positional adjustment of negative lens EXP1 include, for example, wavelength dispersion caused by manufacturing errors of the first light source LD1, changes and distribution of refractive index of the objective lens accompanying temperature changes, focus jump between information recording layers of multiple disc such as 2-layer disc and 4-layer disc, and thickness dispersion and thickness distribution of protective layers of next-generation DVD caused by manufacturing errors.

Incidentally, spherical aberration of a spot formed on information recording surface RL1 of HD can also be controlled, by forming the structure such that the first collimator lens COLL is driven in the optical axis direction, in place of the negative lens EXP1.

In the present embodiment, there is used laser light source unit LU for DVD and CD in which the first emission point EP1 and the second emission point EP2 are formed on the same chip. However, it is also possible to use a laser light source unit for HD, DVD and CD in which the emission point emitting a laser light flux with wavelength 408 nm for HD is also formed on the same chip, without being limited to the foregoing. Or, it is also possible to use a laser light source unit for HD, DVD and CD in which a violet semiconductor laser, a red semiconductor laser and an infrared semiconductor laser are housed in one casing.

Though a light source and photodetector PD are arranged separately in the structure of the present embodiment, a laser light source module wherein a light source and a photodetector are integrated may also be used, without being limited to the foregoing.

Though the first aberration correcting lens L1 and light-converging optical element OL are united solidly through lens frame B in the present embodiment, the first aberration correcting lens L1 and light-converging optical element OL have only to be held so that their mutual positional relationship may remain unchanged when the first aberration correcting lens L1 and light-converging optical element OL are united, and a method such that flange portions respectively of the first aberration correcting lens L1 and light-converging optical element OL are fit and fixed each other may also be used, in addition to the aforesaid method using the lens frame B.

By holding the first aberration correcting lens L1 and light-converging optical element OL so that mutual relative positional relationship may remain unchanged as stated above, occurrence of aberration in the course of focusing and tracking can be controlled, and excellent focusing characteristics or tracking characteristics can be obtained.

Second Embodiment

The second embodiment of the invention will be explained as follows, referring to the drawings, and an explanation for the portion where the structure is the same as that in the First Embodiment will be omitted. In the optical specifications of HD in the present embodiment, the first wavelength $\lambda 1$ is 408 nm, thickness t1 of protective layer PL1 is 0.0875 mm and numerical aperture NA1 is 0.85, while, in optical specifications of DVD, the second wavelength $\lambda 2$ is 658 nm, thickness t2 of protective layer PL2 is 0.6 mm and numerical aperture NA2 is 0.60, and in the optical specifications of CD, the third wavelength $\lambda 3$ is 785 nm, thickness t3 of protective layer PL3 is 1.2 mm and numerical aperture NA3 is 0.45. However, a combination of a wavelength, a thickness of the protective layer and a numerical aperture is not limited to the foregoing.

As shown schematically in FIG. 10, objective lens unit OU in the present embodiment is a structure with three elements in two groups including a lens group formed by attached the first aberration correcting lens L1 that is made of resin, the second aberration correcting lens L2 that is made of resin each other and the light-converging optical element OL that is made of resin on which an aspheric surface form is designed so that the spherical aberration may be minimum for the first wavelength $\lambda 1$ and for thickness t1 of protective layer PL1 of HD. These three elements are united coaxially through lens frame B. Specifically, the first aberration correcting lens L1 and the second aberration correcting lens L2 are jointed each other and the jointed structure is fit and fixed in one end of the cylindrical lens frame B. The light-converging optical element OL is fit and fixed in the other end. It allows these three elements are united coaxially along optical axis X.

In the first aberration correcting lens, Abbe's number vd for d line is 55.0 and refractive index nd for d line is 1.55, in the second aberration correcting lens, Abbe's number vd for d line is 23.0 and refractive index nd for d line is 1.60, while in the light-converging optical element OL, Abbe's number vd for d line is 55.0 and refractive index nd for d line is 1.55.

First phase structure PS1 is formed on an optical surface of the light-converging optical element OL on the light source side, second phase structure PS2 is formed on an optical surface of the first aberration correcting lens L1 on the light source side, and third phase structure PS3 is formed on an optical surface of the second aberration correcting lens L2 on the optical disc side.

Incidentally, since forms and functions of the first and second phase structures PS1 and PS2 are the same as those in the First Embodiment, explanations for them will be omitted.

The third phase structure PS3 does not diffract the first and second light fluxes and diffracts the third light flux, and it is of the structure including patterns arranged concentrically. Each of the patterns has a cross section including an optical axis in a stepped shape with levels. Each step of the stepped shape is shifted by height of steps corresponding to a predefined number A of the levels (3 steps are shifted in the present embodiment) for every predefined number of the levels (4 levels in the present embodiment). Each step amount $\Delta 2$ of the stepped structure is established to satisfy $\Delta 2 = 7 \cdot \lambda 1/(n1-1) = 4.41$ μm. In this case, n1 represents a refractive index of the second aberration correcting lens L2 in wavelength $\lambda 1$.

Since the optical path difference to be added to the first light flux by step amount $\Delta 2$ is $7 \times \lambda 1$, the first light flux is free from any actions of the third phase structure PS3, to be transmitted as it is. Further, since the optical path difference to be added to the second light flux by step amount $\Delta 2$ is $4 \times \lambda 2$, the second light flux is also almost free from any actions of the third phase structure PS3, to be transmitted as it is. On the other hand, the optical path difference to be added to the third light flux by step amount $\Delta 2$ is about $3.25 \times \lambda 3$, and the phase of the third light flux passing through level surfaces before and behind the step $\Delta 2$ is shifted by $2\pi/4$. Since each serration is divided into 4 sections, an amount of shifting of the phase of the third light flux for one serration is just $4 \times 2\pi/4 = 2\pi$, whereby, the first order diffracted light is generated.

As stated above, the third phase structure PS3 diffracts only the third light flux selectively, and thereby, corrects spherical aberration caused by a difference of a protective layer thickness between HD and CD. Incidentally, diffraction efficiency for 0-order diffracted light (transmitted light) of the first light flux generated by the third phase structure PS3 is 100%, diffraction efficiency for 0-order diffracted light (transmitted light) of the second light flux is 95.8%, and diffraction efficiency for the first-order diffracted light of the third light flux is 77.5%, thus, high diffraction efficiency is obtained for all light fluxes.

Third Embodiment

The third embodiment of the invention will be explained as follows, referring to the drawings, and an explanation for the portion where the structure is the same as that in each of the First and Second Embodiments will be omitted.

In the optical specifications of HD in the present embodiment, the first wavelength $\lambda 1$ is 408 nm, thickness t1 of protective layer PL1 is 0.0875 mm and numerical aperture NA1 is 0.85, while, in optical specifications of DVD, the second wavelength $\lambda 2$ is 658 nm, thickness t2 of protective layer PL2 is 0.6 mm and numerical aperture NA2 is 0.60, and in the optical specifications of CD, the third wavelength $\lambda 3$ is 785 nm, thickness t3 of protective layer PL3 is 1.2 mm and numerical aperture NA3 is 0.47. However, a combination of a wavelength, a thickness of the protective layer and a numerical aperture is not limited to the foregoing.

As shown schematically in FIG. 11, objective lens unit OU in the present embodiment is a structure with three elements in three groups including the first aberration correcting lens L1 that is made of resin, the second aberration correcting lens L2 that is made of resin and the light-converging optical element OL that is made of resin on which an aspheric surface form is designed so that the spherical aberration may be minimum for the first wavelength $\lambda 1$ and for thickness t1 of protective layer PL1 of HD. These three elements are united coaxially through lens frame B.

In the first aberration correcting lens L1, Abbe's number vd for d line is 55.0 and refractive index nd for d line is 1.55, in the second aberration correcting lens L2, Abbe's number vd for d line is 23.0 and refractive index nd for d line is 1.60, while in the light-converging optical element OL, Abbe's number vd for d line is 55.0 and refractive index nd for d line is 1.55.

Further, the first phase structure PS1 is formed on an optical surface of the first aberration correcting lens L1 on the optical disc side, the second phase structure PS2 is formed on an optical surface of the first aberration correcting lens L1 on the light source side, and the third phase structure PS3 is formed on an optical surface of the second aberration correcting lens L2 on the light source side.

Incidentally, forms and functions of the second and third phase structures PS2 and PS3 are the same as those in the first embodiment stated above, and explanation for them will be omitted accordingly.

The first phase structure PS1 diffracts the first-third light fluxes, and its cross-sectional form including an optical axis that is in a form of a stepped shape. This first phase structure PS1 is a structure to control a movement of a position of the paraxial image point resulting from a microscopic change of the first wavelength $\lambda 1$ and to control a change in spherical aberration, under heat radiation from biaxial actuator AC1 and changes in ambient temperatures.

Each step amount $\Delta 3$ of the stepped structure is established to the height that satisfies $\Delta 3 = 10 \cdot \lambda 1/(n1-1) = 7.20$ nm.

When the first phase structure PS1 is passed through, there are generated $10^{th}$ order diffracted light of the first light flux, $6^{th}$ order diffracted light of the second light flux and $5^{th}$ order diffracted light of the third light flux.

An optical path difference to be added to the first light flux when it passes through the first phase structure PS1 is $10.0 \times \lambda 1$, and $10^{th}$ order diffracted light of the first light flux has the maximum diffraction efficiency.

Further, an optical path difference to be added to the second light flux when it passes through the first phase structure PS1 is $5.99 \times \lambda 2 \approx 6 \times \lambda 2$, and $6^{th}$ order diffracted light of the second light flux has the maximum diffraction efficiency.

Further, an optical path difference to be added to the third light flux when it passes through the first phase structure PS1 is $4.98 \times \lambda 3 \approx 5 \times \lambda 3$, and $5^{th}$ order diffracted light of the third light flux has the maximum diffraction efficiency.

Diffraction efficiencies of $10^{th}$ order diffracted light of the first light flux, $6^{th}$ order diffracted light of the second light flux and of $5^{th}$ order diffracted light of the third light flux are respectively 100%, 99.9% and 99.9%, thus, high diffraction efficiency is obtained for all light fluxes.

By providing a paraxial diffractive power of the first phase structure PS1 for the first wavelength and a paraxial refractive power of the optical surface of the first phase structure PS1 facing the optical-disc side which have different signs and the same absolute values each other, a diameter of the light flux of the first light flux passing through an optical surface of the first aberration correcting lens L1 on the optical disc side is made to remain unchanged.

Though an illustration is omitted, by equipping with the optical pickup apparatus PU shown in the aforementioned embodiment, a rotary driving apparatus that holds an optical disc rotatably and with a control apparatus that controls driving of the aforesaid apparatuses, it is possible to obtain an optical disc drive apparatus that can conduct at least one of recording of optical information for the optical disc and reproducing of information recorded on the optical disc.

Fourth Embodiment

The fourth embodiment of the invention will be explained as follows, referring to the drawings, and an explanation for the portion where the structure is the same as that in the First Embodiment will be omitted.

In the optical specifications of HD in the present embodiment, the first wavelength $\lambda 1$ is 408 nm, thickness t1 of protective layer PL1 is 0.0875 mm and numerical aperture NA1 is 0.85, while, in optical specifications of DVD, the second wavelength $\lambda 2$ is 658 nm, thickness t2 of protective layer PL2 is 0.6 mm and numerical aperture NA2 is 0.60, and in the optical specifications of CD, the third wavelength $\lambda 3$ is 785 nm, thickness t3 of protective layer PL3 is 1.2 mm and numerical aperture NA3 is 0.45. However, a combination of a wavelength, a thickness of the protective layer and a numerical aperture is not limited to the foregoing.

As shown schematically in FIG. 10, objective lens unit OU in the present embodiment is a structure with three elements in two groups including a lens group with the first aberration correcting lens L1 that is made of resin and the second aberration correcting lens L2 that is made of resin are attached each other and the light-converging optical element OL that is made of resin on which an aspheric surface form is designed so that the spherical aberration may be minimum for the first wavelength $\lambda 1$ and for thickness t1 of protective layer PL1 of HD. These three elements are united coaxially through lens frame B. Specifically, the first aberration correcting lens L1 and the second aberration correcting lens L2 are attached each other and the attached structure is fit and fixed in one end of the cylindrical lens frame B. The light-converging optical element OL is fit and fixed in the other end. It allows these three elements are united coaxially along optical axis X.

In the first aberration correcting lens, Abbe's number vd for d line is 55.0 and refractive index nd for d line is 1.55, in the second aberration correcting lens, Abbe's number vd for d line is 35.0 and refractive index nd for d line is 1.60, while in the light-converging optical element OL, Abbe's number vd for d line is 55.0 and refractive index nd for d line is 1.55.

First phase structure PS1 is formed on an optical surface of the light-converging optical element OL on the light source side, second phase structure PS2 is formed on an optical surface of the first aberration correcting lens L1 on the light source side, and third phase structure PS3 is formed on an optical surface of the second aberration correcting lens L2 on the optical disc side.

Incidentally, since forms and functions of the first and second phase structures PS1 and PS2 are the same as those in the First Embodiment, explanations for them will be omitted.

The third phase structure PS3 does not diffract the first and second light fluxes and diffracts the third light flux, and it is a structure including a plurality of patterns arranged concentrically, each of the plurality of patterns has a cross section including an optical axis in a stepped shape with a plurality of levels, a height of each step is shifted for every predefined number of levels (3 level surfaces in the present embodiment) by height of steps corresponding to the predefined number of levels (2-step shifting structure in the present embodiment). Each step amount $\Delta 2$ of the stepped structure is established to satisfy $\Delta 2 = 5 \cdot \lambda 1/(n1-1) = 3.24$ μm or $\Delta 2 = 7 \cdot \lambda 1/(n1-1) = 4.53$ μm. In this case, n1 represents a refractive index of the second aberration correcting lens L2 in wavelength $\lambda 1$.

When the step satisfies $\Delta 2 = 5 \cdot \lambda 1/(n1-1) = 3.24$ μm, the optical path difference to be added to the first light flux by step amount $\Delta 2$ is $5 \times \lambda 1$. Therefore, first light flux is free from any actions of the third phase structure PS3, to be transmitted as it is. Further, since the optical path difference to be added to the second light flux by step amount $\Delta 2$ is $3 \times \lambda 2$, the second light flux is also almost free from any actions of the third phase structure PS3, to be transmitted as it is. On the other hand, the optical path difference to be added to the third light flux by step amount $\Delta 2$ is about $2.4 \times \lambda 3$, and the phase of the third light flux passing through level surfaces before and behind the step $\Delta 2$ is shifted by $2\pi/3$. Since each serration is divided into 3 sections, an amount of shifting of the phase of the third light flux for one serration is just $3 \times 2\pi/3 = 2\pi$, whereby, the first order diffracted light is generated.

When the step amount satisfies $\Delta 2 = 7 \cdot \lambda 1/(n1-1) = 4.53$ μm, the optical path difference to be added to the first light flux by step amount $\Delta 2$ is $7 \times \lambda 1$, the first light flux is free from any actions of the third phase structure PS3, to be transmitted as it is. Further, since the optical path difference to be added to the second light flux by step amount $\Delta 2$ is $4 \times \lambda 2$, the second light flux is also almost free from any actions of the third phase structure PS3, to be transmitted as it is. On the other hand, the optical path difference to be added to the third light flux by step amount $\Delta 2$ is about $3.4 \times \lambda 3$, and the phase of the third light flux passing through level surfaces before and behind the step amount $\Delta 2$ is shifted by $2\pi/3$. Since each serration is divided into 3 sections, an amount of shifting of the phase of the third light flux for one serration is just $3 \times 2\pi/3 = 2\pi$, whereby, the first order diffracted light is generated.

As stated above, the third phase structure PS3 diffracts only the third light flux selectively, and thereby, corrects spherical aberration caused by a difference of a protective layer thickness between HD and CD.

Incidentally, when the step amount satisfies $\Delta 2 = 5 \cdot \lambda 1/(n1-1) = 3.24$ μm, diffraction efficiency for 0-order diffracted light (transmitted light) of the first light flux generated by the third phase structure PS3 is 100%, diffraction efficiency for 0-order diffracted light (transmitted light) of the second light flux is 87.1%, and diffraction efficiency for the first-order diffracted light of the third light flux is 53.1%, thus, high diffraction efficiency is obtained for all light fluxes.

Further, when the step amount satisfies $\Delta 2 = 7 \cdot \lambda 1/(n1-1) = 4.53$ μm, diffraction efficiency for 0-order diffracted light (transmitted light) of the first light flux generated by the third phase structure PS3 is 100%, diffraction efficiency for 0-order diffracted light (transmitted light) of the second light flux is 76.4%, and diffraction efficiency for the first-order diffracted light of the third light flux is 60.4%, thus, high diffraction efficiency is obtained for all light fluxes.

Next, a specific numerical example (Example 1) of objective optical element OU shown in FIG. 9 will be illustrated.

The objective optical element OU of the present example is a structure with two elements in two groups including the first aberration correcting lens L1 that is made of resin and light-converging optical element OL that is made of resin.

Lens data of the present example are shown in Table 1. In the present numerical example, an optical path difference added to an incident light flux by each of the first—third phase structures PS1-PS3 is expressed by an optical path difference function.

TABLE 1

(Paraxial data)

| Surface No. | r (mm) | d (mm) | $n_{408}$ | $n_{658}$ | $n_{785}$ | $n_d$ | $v_d$ | Remarks |
|---|---|---|---|---|---|---|---|---|
| OBJ | | ∞ | | ∞ | | | | Emission point |
| 1 | ∞ | 0.900 | 1.56652 | 1.54691 | 1.54316 | 1.55000 | 55.0 | Second phase structure |
| 2 | ∞ | 0.100 | | | | | | Third phase structure |
| 3 | 1.41914 | 2.620 | 1.56652 | 1.54691 | 1.54316 | 1.55000 | 55.0 | First phase structure |
| 4 | −3.35718 | d1 | | | | | | |
| 5 | ∞ | d2 | 1.62110 | 1.57975 | 1.57326 | 1.58550 | 30.0 | Protective layer |
| 6 | ∞ | | | | | | | |

| | HD | DVD | CD |
|---|---|---|---|
| d1 | 0.6758 | 0.4396 | 0.3200 |
| d2 | 0.0875 | 0.6000 | 1.2000 |

TABLE 1-continued

| (Aspheric surface coefficient) | | (Diffraction surface coefficient) | | | |
|---|---|---|---|---|---|
| | Third surface | Fourth surface | | First surface | Second surface | Third surface |
| κ | −6.5353E−01 | −100 | $M_{HD}/M_{DVD}/M_{CD}$ | 0/1/0 | 0/0/1 | 2/1/1 |
| A4 | −3.0407E−03 | 1.0205E−01 | λB | 658 nm | 785 nm | 408 nm |
| A6 | 7.6952E−04 | −9.3503E−02 | B2 | 3.2952E−03 | 2.5386E−02 | 0 |
| A8 | 2.0042E−03 | 6.0215E−02 | B4 | −2.3327E−03 | −2.1870E−03 | −3.7303E−03 |
| A10 | −1.3367E−03 | −3.3522E−02 | B6 | 3.0412E−04 | 1.8173E−03 | 4.8674E−04 |
| A12 | 2.4426E−04 | 1.1443E−02 | B8 | −1.6836E−04 | −8.0314E−04 | −6.0552E−05 |
| A14 | 2.2537E−04 | −1.6675E−03 | B10 | 1.7171E−05 | 1.4348E−04 | −2.4194E−05 |
| A16 | −1.6578E−04 | 0 | | | | |
| A18 | 4.3765E−05 | 0 | | | | |
| A20 | −4.3780E−06 | 0 | | | | |

The objective optical element of the present example has compatibility for HD, DVD and CD wherein focal length f is set to 2.20 mm, numerical aperture NA is set to 0.85 and magnification m is set to 0 for wavelength λ1 of 408 nm, focal length f is set to 2.28 mm, numerical aperture NA is set to 0.60 and magnification m is set to 0 for wavelength λ2 of 658 nm, and focal length f is set to 2.37 mm, numerical aperture NA is set to 0.47 and magnification m is set to 0 for wavelength λ3 of 785 nm.

In the Table 1, r (mm) represents a radius of curvature, d (mm) represents a distance between lenses, $n_{408}$, $n_{658}$ and $n_{785}$ represent respectively refractive indexes of lens for first wavelength λ1 (=408 nm), second wavelength λ2 (=658 nm) and third wavelength λ3 (=785 nm), vd represents Abbe's number of lens for d line, and $M_{HD}$, $M_{DVD}$ and $M_{CD}$ represent respectively diffraction order number of diffracted light used for recording and reproducing for HD, diffraction order number of diffracted light used for recording and reproducing for DVD, and diffraction order number of diffracted light used for recording and reproducing for CD. Further, an exponent of 10 (for example, $2.5 \times 10^{-3}$) is assumed to be expressed by using E (for example, 2.5E-3).

Each of an optical surface (first surface) of the first aberration correcting lens L1 on the light source side and an optical surface (second surface) on the optical disc side is a plane. Each of an optical surface (third surface) of the light-converging optical element on the light source side and an optical surface (fourth surface) on the optical disc side is in a form of an aspheric surface, and this aspheric surface is expressed by the numerical expression wherein a coefficient in the table is substituted in the following expression for a form of aspheric surface;

Aspheric surface form expression (Numeral 1)

$$x(h) = \frac{h^2/r}{1 + \sqrt{1 - (1+\kappa)(h/r)^2}} + \sum_{i=2} A_{2i} h^{2i}$$

where x(h) represents an aspheric surface form (a distance in the optical axis direction from a plane that is tangent to the aspheric surface at the vertex), h represents a distance from the optical axis, r represents a radius of curvature, k represents conic constant and $A_{2i}$ represents aspheric surface coefficient.

Each of the second phase structure PS2 on the first surface, the third phase structure PS3 on the second surface and the first phase structure PS1 on the third surface is expressed by an optical path difference added to the incident light flux by each phase structure. The optical path difference of this kind is expressed by the optical path difference function φ (mm) wherein a coefficient in the table is substituted in the following expression expressing the optical path difference function;

Optical path difference function (Numeral 2)

$$\phi(h) = \frac{\lambda}{\lambda_B} \times n \times \sum_{i=1} B_{2i} h^{2i}$$

where φ(h) represents an optical path difference function, λ represents a wavelength of the light flux entering the phase structure, $\lambda_B$ represents a manufacture wavelength, n represents a diffraction order number of diffracted light used for recording and reproducing for an optical disc, h represents a distance from the optical axis and $B_{2i}$ represents a diffractive surface coefficient.

Next, a specific numerical example (Example 2) of objective optical element OU shown in FIG. 10 will be illustrated.

The objective optical element OU of the present example is a structure with three elements in two groups including the first aberration correcting lens L1 that is made of resin, the second aberration correcting lens L2 that is made of resin and a light-converging optical element OL.

Lens data of the present example are shown in Table 2.

TABLE 2

| | (Paraxial data) | | | | | | | |
|---|---|---|---|---|---|---|---|---|
| Surface No. | r (mm) | d (mm) | $n_{408}$ | $n_{658}$ | $n_{785}$ | $n_d$ | $v_d$ | Remarks |
| OBJ | ∞ | ∞ | | | | | | Emission point |
| 1 | ∞ | 0.800 | 1.56652 | 1.54691 | 1.54316 | 1.55000 | 55.0 | Second phase structure |

TABLE 2-continued

| | | | | | | | | |
|---|---|---|---|---|---|---|---|---|
| 2 | ∞ | 0.100 | 1.64761 | 1.59241 | 1.58383 | 1.60000 | 23.0 | |
| 3 | ∞ | 0.100 | | | | | | Third phase structure |
| 4 | 1.41914 | 2.620 | 1.56652 | 1.54691 | 1.54316 | 1.55000 | 55.0 | First phase structure |
| 5 | −3.35718 | d1 | | | | | | |
| 6 | ∞ | d2 | 1.62110 | 1.57975 | 1.57326 | 1.58550 | 30.0 | Protective layer |
| 7 | ∞ | | | | | | | |

| | HD | DVD | CD |
|---|---|---|---|
| d1 | 0.6758 | 0.4253 | 0.5558 |
| d2 | 0.0875 | 0.6000 | 1.2000 |

| (Aspheric surface coefficient) | | (Diffraction surface coefficient) | | | |
|---|---|---|---|---|---|
| | Fourth surface | Fifth surface | | First surface | Third surface | Fourth surface |
| κ | −6.5353E−01 | −100 | $M_{HD}/M_{DVD}/M_{CD}$ | 0/1/0 | 0/0/1 | 2/1/1 |
| A4 | −3.0407E−03 | 1.0205E−01 | λB | 658 nm | 785 nm | 408 nm |
| A6 | 7.6952E−04 | −9.3503E−02 | B2 | 1.8996E−03 | 4.3502E−02 | 0 |
| A8 | 2.0042E−03 | 6.0215E−02 | B4 | −2.3412E−03 | −4.2791E−03 | −3.7303E−03 |
| A10 | −1.3367E−03 | −3.3522E−02 | B6 | 2.4335E−04 | 6.1920E−03 | 4.8674E−04 |
| A12 | 2.4426E−04 | 1.1443E−02 | B8 | −1.4574E−04 | −3.3320E−03 | −6.0552E−05 |
| A14 | 2.2537E−04 | −1.6675E−03 | B10 | 1.4231E−05 | 9.4757E−04 | −2.4194E−05 |
| A16 | −1.6578E−04 | 0 | | | | |
| A18 | 4.3765E−05 | 0 | | | | |
| A20 | −4.3780E−06 | 0 | | | | |

The objective optical element of the present example has compatibility for HD, DVD and CD wherein focal length f is set to 2.20 mm, numerical aperture NA is set to 0.85 and magnification m is set to 0 for wavelength λ1 of 408 nm, focal length f is set to 2.27 mm, numerical aperture NA is set to 0.60 and magnification m is set to 0 for wavelength λ2 of 658 nm, and focal length f is set to 2.63 mm, numerical aperture NA is set to 0.45 and magnification m is set to 0 for wavelength λ3 of 785 nm.

Each of an optical surface (first surface) of the first aberration correcting lens L1 on the light source side and an optical surface (third surface) of the second aberration correcting lens L2 on the optical disc side is a plane. Each of an optical surface (fourth surface) of the light-converging optical element OL on the light source side and an optical surface (fifth surface) on the optical disc side is in a form of an aspheric surface, and this aspheric surface is expressed by the numerical expression wherein a coefficient in the table is substituted in the expression for a form of aspheric surface mentioned above.

Each of the second phase structure PS2 on the first surface, the third phase structure PS3 on the third surface and the first phase structure PS1 on the fourth surface is expressed by an optical path difference added to the incident light flux by each phase structure. The optical path difference of this kind is expressed by the optical path difference function ϕ(mm) wherein a coefficient in the table is substituted in the following expression expressing the optical path difference function.

Next, a specific numerical example (Example 3) of objective optical element OU shown in FIG. 11 will be illustrated.

The objective optical element OU of the present example is a structure with three elements in three groups including the first aberration correcting lens L1 that is made of resin, the second aberration correcting lens L2 that is made of resin and a light-converging optical element.

Lens data of the present example are shown in Table 3.

TABLE 3

| (Paraxial data) | | | | | | | | |
|---|---|---|---|---|---|---|---|---|
| Surface No. | r (mm) | d (mm) | $n_{408}$ | $n_{658}$ | $n_{785}$ | $n_d$ | $v_d$ | Remarks |
| OBJ | ∞ | ∞ | | | | | | Emission point |
| 1 | ∞ | 0.900 | 1.56652 | 1.54691 | 1.54316 | 1.55000 | 55.0 | Second phase structure |
| 2 | 28.62010 | 0.100 | | | | | | First phase structure |
| 3 | ∞ | 0.900 | 1.64761 | 1.59241 | 1.58383 | 1.60000 | 23.0 | Third phase structure |
| 4 | ∞ | 0.100 | | | | | | |
| 5 | 1.46123 | 2.620 | 1.56652 | 1.54691 | 1.54316 | 1.55000 | 55.0 | |
| 6 | −298092 | d1 | | | | | | |
| 7 | ∞ | d2 | 1.62110 | 1.57975 | 1.57326 | 1.58550 | 30.0 | Protective layer |
| 8 | ∞ | | | | | | | |

| | HD | DVD | CD |
|---|---|---|---|
| d1 | 0.7191 | 0.4874 | 0.3200 |
| d2 | 0.0875 | 0.6000 | 1.2000 |

TABLE 3-continued

| | (Aspheric surface coefficient) | | | | (Diffraction surface coefficient) | | |
|---|---|---|---|---|---|---|---|
| | Second surface | Fifth surface | Sixth surface | | First surface | Second surface | Third surface |
| κ | 8.3646E+01 | −6.3859E−01 | −2.8440E+01 | $M_{HD}/M_{DVD}/M_{CD}$ | 0/1/0 | 10/6/5 | 0/0/1 |
| A4 | 2.2855E−02 | 6.7764E−03 | 1.2550E−01 | λB | 658 nm | 408 nm | 785 nm |
| A6 | −1.1645E−04 | −5.4011E−04 | −1.2189E−01 | B2 | 3.7582E−03 | −9.8973E−04 | 2.2315E−02 |
| A8 | −1.3690E−04 | 2.4371E−04 | 7.1513E−02 | B4 | −6.4357E−04 | −1.3208E−03 | 2.9359E−04 |
| A10 | 4.2422E−04 | −1.3270E−03 | −2.7970E−02 | B6 | −4.3847E−04 | 5.5518E−06 | −3.3936E−03 |
| A12 | 0 | 2.5676E−04 | 6.4203E−03 | B8 | 1.2027E−04 | 7.5230E−06 | 3.4461E−03 |
| A14 | 0 | 2.2698E−04 | −6.5216E−04 | B10 | −2.3302E−05 | −2.4012E−05 | −1.2242E−03 |
| A16 | 0 | −1.6467E−04 | 0 | | | | |
| A18 | 0 | 4.3311E−05 | 0 | | | | |
| A20 | 0 | −4.3257E−06 | 0 | | | | |

The objective optical element of the present example has compatibility for HD, DVD and CD wherein focal length f is set to 2.20 mm, numerical aperture NA is set to 0.85 and magnification m is set to 0 for wavelength λ1 of 408 nm, focal length f is set to 2.25 mm, numerical aperture NA is set to 0.60 and magnification m is set to 0 for wavelength λ2 of 658 nm, and focal length f is set to 2.37 mm, numerical aperture NA is set to 0.47 and magnification m is set to 0 for wavelength λ3 of 785 nm.

Each of an optical surface (first surface) of the first aberration correcting lens L1 on the light source side, an optical surface (third surface) on the light source side and an optical surface (fourth surface) on the optical disc side both of the second aberration correcting lens L2 is a plane. Further, each of an optical surface (second surface) of the first aberration correcting lens L1, an optical surface (fifth surface) on the light source side and an optical surface (sixth surface) on the optical disc side both of the light-converging optical element OL is in a form of an aspheric surface, and this aspheric surface is expressed by the numerical expression wherein a coefficient in the Table is substituted in the expression of the aspheric surface form.

Each of the second phase structure PS2 on the first surface, the first phase structure PS1 on the second surface and the third phase structure PS3 on the third surface is expressed by an optical path difference added to the incident light flux by each phase structure. The optical path difference of this kind is expressed by the optical path difference function φ(mm) wherein a coefficient in the table is substituted in the following expression expressing the optical path difference function.

Next, a specific numerical example (Example 4) of objective optical element OU shown in FIG. 10 will be illustrated.

The objective optical element OU of the present example is a structure with three elements in two groups element including the first aberration correcting lens L1 that is made of resin, the second aberration correcting lens L2 that is made of resin and the light-converging optical element OL.

Lens data of the present example are shown in Table 4.

Herein, the same lens data is used for both of the structures in which the step satisfies Δ2=5·λ1/(n1−1)=3.24 μm and the structure in which the step satisfies Δ2=7·λ1/(n1−1)=4.53 μm in this embodiment.

TABLE 4

(Paraxial data)

| Surface No. | r (mm) | d (mm) | $n_{408}$ | $n_{658}$ | $n_{785}$ | $n_d$ | $v_d$ | Remarks |
|---|---|---|---|---|---|---|---|---|
| OBJ | ∞ | ∞ | | | | | | Emission point |
| 1 | ∞ | 0.800 | 1.56652 | 1.54691 | 1.54316 | 1.55000 | 55.0 | Second phase structure |
| 2 | ∞ | 0.100 | 1.62985 | 1.59487 | 1.58890 | 1.60000 | 35.0 | |
| 3 | ∞ | 0.100 | | | | | | Third phase structure |
| 4 | 1.41914 | 2.620 | 1.56652 | 1.54691 | 1.54316 | 1.55000 | 55.0 | First phase structure |
| 5 | −3.35718 | d1 | | | | | | |
| 6 | ∞ | d2 | 1.62110 | 1.57975 | 1.57326 | 1.58550 | 30.0 | Protective layer |
| 7 | ∞ | | | | | | | |

| | HD | DVD | CD |
|---|---|---|---|
| d1 | 0.6758 | 0.4253 | 0.5557 |
| d2 | 0.0875 | 0.6000 | 1.2000 |

| | (Aspheric surface coefficient) | | | (Diffractive surface coefficient) | | |
|---|---|---|---|---|---|---|
| | Fourth surface | Fifth surface | | First surface | Third surface | Fourth surface |
| κ | −6.5353E−01 | −100 | $M_{HD}/M_{DVD}/M_{CD}$ | 0/1/0 | 0/0/1 | 2/1/1 |
| A4 | −3.0407E−03 | 1.0205E−01 | λB | 658 nm | 785 nm | 408 nm |
| A6 | 7.6952E−04 | −9.3503E−02 | B2 | 1.9015E−03 | 4.3502E−02 | 0 |
| A8 | 2.0042E−03 | 6.0215E−02 | B4 | −2.3413E−03 | −4.2792E−03 | −3.7303E−03 |
| A10 | −1.3367E−03 | −3.3522E−02 | B6 | 2.4347E−04 | 6.1921E−03 | 4.8674E−04 |

TABLE 4-continued

| A12 | 2.4426E−04  | 1.1443E−02  | B8  | −1.4572E−04 | −3.3320E−03 | −6.0552E−05 |
| A14 | 2.2537E−04  | −1.6675E−03 | B10 | 1.4213E−05  | 9.4756E−04  | −2.4194E−05 |
| A16 | −1.6578E−04 | 0           |     |             |             |             |
| A18 | 4.3765E−05  | 0           |     |             |             |             |
| A20 | −4.3780E−06 | 0           |     |             |             |             |

The objective optical element of the present example has compatibility for HD, DVD and CD wherein focal length f is set to 2.20 mm, numerical aperture NA is set to 0.85 and magnification m is set to 0 for wavelength λ1 of 408 nm, focal length f is set to 2.27 mm, numerical aperture NA is set to 0.60 and magnification m is set to 0 for wavelength λ2 of 658 nm, and focal length f is set to 2.63 mm, numerical aperture NA is set to 0.45 and magnification m is set to 0 for wavelength λ3 of 785 nm.

Each of an optical surface (first surface) of the first aberration correcting lens L1 on the light source side and an optical surface (third surface) of the second aberration correcting lens L2 on the optical disc side is a plane. Each of an optical surface (fourth surface) of the light-converging optical element OL on the light source side and an optical surface (fifth surface) on the optical disc side is in a form of an aspheric surface, and this aspheric surface is expressed by the numerical expression wherein a coefficient in the table is substituted in the expression for a form of aspiheric surface mentioned above.

Each of the second phase structure PS2 on the first surface, the third phase structure PS3 on the third surface and the first phase structure PS1 on the fourth surface is expressed by an optical path difference added to the incident light flux by each phase structure. The optical path difference of this kind is expressed by the optical path difference function φ(mm) wherein a coefficient in the table is substituted in the following expression expressing the optical path difference function.

FIG. 12 is a graph showing an effect of compensation of temperature characteristics on HD having the first phase structure in the Example 1.

In FIG. 12, the axis of abscissa Δt (° C.) of the graph shows an amount of temperature change from the reference temperature, and the axis of ordinate ΔSA (λ1 rms) shows an amount of changes of spherical aberration caused by temperature changes.

In this case, when amount of change of refractive index $dn_d1/dt$ of light-converging optical element OL caused by temperature changes is made to be $dn_d1/dt=-1.2\times10^{-4}$ (1/° C.), and amount of change of wavelength $d\lambda_1/dt$ of the first light source caused by temperature changes is made to be $d\lambda_1/dt=5.0\times10^{-2}$ (nm/° C.), a wavelength of the first light source becomes 408+1.5=409.5 nm, when a temperature rises to be higher than the reference temperature by 30° C., and the refractive index of the light-converging optical element OL at that time becomes 1.56268. The temperature characteristics were calculated by using these values.

The temperature characteristics in the case of the absence of the first phase structure were calculated by the use of a lens that has the same specifications as those of the light-converging optical element OL but does not have the first phase structure.

Incidentally, the graph showing the effect of compensation of temperature characteristics on HD having the first phase structure in each of Example 2 and Example 4 was the same as that shown in FIG. 12.

FIG. 13 is a graph showing an effect of compensation of temperature characteristics on HD having the first phase structure in the Example 3.

A method of calculation of temperature characteristics is the same as that in the Example 1, and the temperature characteristics in the case of the absence of the first phase structure were calculated by the use of a lens wherein an optical surface (second surface) of the first aberration correcting lens L1 on the optical disc side was made to be a plane.

FIGS. 12 and 13 show that an amount of changes of spherical aberration caused by temperature changes can be restrained, by providing the first phase structure PS1 on objective optical element OU.

While the preferred embodiments of the present invention have been described using specific terms, such description is for illustrative purposes only, and it is to be understood that changes and variations may be made without departing from the spirit or scope of the appended claims.

What is claimed is:

1. An objective optical element for use in an optical pickup apparatus for recording and/or reproducing information on a first optical information recording medium having a protective substrate with a thickness t1 using a first light flux with a wavelength λ1 emitted by a first light source, for recording and/or reproducing information on a second optical information recording medium having a protective substrate with a thickness t2 (t1≦t2) using a second light flux with a wavelength λ2 (λ1<λ2) emitted by a second light source and for recording and/or reproducing information on a third optical information recording medium having a protective substrate with a thickness t3 (t2<t3) using the third light flux (λ2<λ3) emitted by the third light source and for forming a converged spot on an information recording surface of each of the first through third optical information recording media, the objective optical element comprising:

a first phase structure for compensating a deterioration in a performance forming the converged spot on the information recording surface of the first optical information recording medium caused by an temperature change;

a second phase structure for reducing a spherical aberration based on a thickness difference between the protective substrate t1 and the protective substrate t2 or a wavelength difference between the wavelength λ1 and the wavelength λ2; and a third phase structure for reducing a spherical aberration based on a thickness difference between the protective substrate t1 and the protective substrate t3.

2. The objective optical element of claim 1, wherein the first phase structure has a cross section including an optical axis whose shape is:

a phase difference providing structure providing a longer optical path length on a farther position from the optical axis when the position is in a range from the optical axis to a predefined height on the phase difference providing structure and providing a shorter optical path length on a farther position from the optical axis when the position is higher than the predefined height from the optical axis on the phase difference providing structure; or a phase difference providing structure providing a shorter optical path length on a farther position from the optical axis when the position is in a range from the optical axis to a predefined height on the cross section on the phase difference providing structure and providing a longer optical path length on a farther position from the optical axis when the position is higher from the predefined height from the optical axis on the phase difference providing structure.

3. The objective optical element of claim 2,
wherein an area in the first phase structure providing a same phase to a phase at the predefined height of the first phase structure includes a position which is at 70% of an effective light flux diameter of the first light flux.

4. The objective optical element of claim 1,
wherein the first phase structure is a phase difference providing structure which generates α1-th order diffracted light flux having a maximum diffraction efficiency among diffracted light fluxes generated when the first light flux enters into the first phase structure,
generates β1-th (β1<α1) order diffracted light flux having a maximum diffraction efficiency among diffracted light fluxes generated when the second light flux enters into the first phase structure, and
generates γ1-th (γ1≦β1) order diffracted light flux having a maximum diffraction efficiency among diffracted light fluxes generated when the third light flux enters into the first phase structure.

5. The objective optical element of claim 2,
wherein a cross section including an optical axis of the phase difference providing structure has a stepped structure.

6. The objective optical element of claim 5,
wherein the first phase structure satisfies following expressions:

$p=INT(d(n1-1)/\lambda 1)$, $q=INT(d(n3-1)/\lambda 3)$ and $p>q$, where d is a step amount of the first phase structure,
n1 is a refractive index of a medium of the first phase structure for the first light flux,
n3 is a refractive index of a medium of the first phase structure for the third light flux, and
Int(X) is an integer value closest to X.

7. The objective optical element of claim 1,
wherein the second phase structure diffracts the second light flux and does not diffract the first light flux and the third light flux.

8. The objective optical element of claim 7,
wherein the second phase structure is a structure including a plurality of patterns arranged concentrically,
each of the plurality of patterns has a cross section including an optical axis in a stepped shape with a plurality of levels, and
each step of the stepped shape is shifted by height of steps corresponding to a predefined number A of the plurality of levels for every predefined number A of the levels.

9. The objective optical element of claim 8,
wherein the predefined number A of the levels is one of 4, 5 and 6.

10. The objective optical element of claim 8,
wherein an amount of an optical path difference generated by one of the steps is twice of the first wavelength λ1.

11. The objective optical element of claim 7,
wherein the second phase structure satisfies 40<vd2<70,
where vd2 is an Abbe number of a medium of the second phase structure.

12. The objective optical element of claim 1,
wherein the second phase structure is a diffractive structure which generates α2-th order diffracted light flux having a maximum diffraction efficiency among diffracted light fluxes generated when the first light flux enters into the second phase structure,
generates β2-th (β2<α2) order diffracted light flux having a maximum diffraction efficiency among diffracted light fluxes generated when the second light flux enters into the second phase structure, and
generates γ2-th (γ2<β2) order diffracted light flux having a maximum diffraction efficiency among diffracted light fluxes generated when the third light flux enters into the second phase structure.

13. The objective optical element of claim 1,
wherein the third phase structure is a diffractive structure which diffracts the third light flux and does not diffract the first light flux and the second light flux.

14. The objective optical element of claim 13,
wherein the third phase structure is a structure including a plurality of patterns arranged concentrically,
each of the plurality of patterns has a cross section including an optical axis in a stepped shape with a plurality of levels,
each step of the stepped shape is shifted by height of steps corresponding to a predefined number B of the plurality of levels for every predefined number B of the levels.

15. The objective optical element of claim 14,
wherein the third phase structure satisfies 40<vd3<70,
where vd3 is an Abbe number of a medium of the third phase structure and
the predefined number B of the levels is 2.

16. The objective optical element of claim 15,
wherein an amount of an optical path difference generated by one of the steps is five times of the first wavelength λ1.

17. The objective optical element of claim 14,
wherein the third phase structure satisfies 24<vd3<40,
where vd3 is an Abbe number of a medium of the third phase structure and
the predefined number B of the levels is 3.

18. The objective optical element of claim 17,
wherein an amount of an optical path difference generated by one of the steps is five times or seven times of the first wavelength λ1.

19. The objective optical element of claim 14,
wherein the third phase structure satisfies 20<vd3<26,
where vd3 is an Abbe number of a medium of the third phase structure and
the predefined number B of levels is 4.

20. The objective optical element of claim 19,
wherein an amount of an optical path difference generated by one of the steps is seven times of the first wavelength λ1.

21. The objective optical element of claim 1,
wherein the third phase structure is a diffractive structure which generates α3-th order diffracted light flux having a maximum diffraction efficiency among diffracted light fluxes generated when the first light flux enters into the third phase structure, generates β3-th (β3<α3) order diffracted light flux having a maximum diffraction efficiency among diffracted light fluxes generated when the second light flux enters into the third phase structure, and generates β3-th (β3<α3) order diffracted light flux having a maximum diffraction efficiency among diffracted light fluxes generated when the third light flux enters into the third phase structure.

22. The objective optical element of claim 21, wherein the third phase structure satisfies 20<vd3<40, where vd3 is an Abbe number of a medium of the third phase structure.

23. The objective optical element of claim 22, wherein α3 is an odd number.

24. The objective optical element of claim 1, wherein the objective optical element comprises a light converging optical element and an aberration correcting lens group.

25. The objective optical element of claim 24, consisting of two elements formed in two groups and including at least one light converging optical element.

26. The objective optical element of claim 24, consisting of three elements formed in two groups and including at least a light converging optical element formed in one group and, wherein one of the two groups includes two optical elements which are made of different media each other and are attached each other.

27. The objective optical element of claim 24, consisting of three elements formed in three groups and including at least one light converging optical element.

28. The objective optical element of claim 24, wherein the light converging optical element is formed of a resin material.

29. The objective optical element of claim 24, wherein each element forming the objective optical element is formed of a resin material.

30. An optical pickup apparatus, comprising:

a first light source for emitting a first light flux with a wavelength $\lambda 1$ for recording and/or reproducing information on a first optical information recording medium having a protective substrate with a thickness t1;

a second light source for emitting a second light flux with a wavelength $\lambda 2$ ($\lambda 1 < \lambda 2$) for recording and/or reproducing information on a second optical information recording medium having a protective substrate with a thickness t2 (t1≦t2);

a third light source for emitting a third light flux ($\lambda 2 < \lambda 3$) for recording and/or reproducing information on a third optical information recording medium having a protective substrate with a thickness t3 (t2<t3); and the objective optical element of claim 1.

31. An optical disc drive apparatus, comprising:

the optical pickup apparatus of claim 30; and a moving unit for moving the optical pickup apparatus in a radius direction of each of the first to third optical information recording media.

* * * * *